US010961596B2

(12) United States Patent
Ito et al.

(10) Patent No.: US 10,961,596 B2
(45) Date of Patent: Mar. 30, 2021

(54) METHOD FOR SUPPLYING HYDROGEN-CONTAINING REDUCING GAS TO SHAFT PART OF BLAST FURNACE

(71) Applicants: NIPPON STEEL & SUMITOMO METAL CORPORATION, Tokyo (JP); JFE STEEL CORPORATION, Tokyo (JP); KOBE STEEL, LTD., Kobe (JP); NISSHIN STEEL CO., LTD., Tokyo (JP); NIPPON STEEL & SUMIKIN ENGINEERING CO., LTD., Tokyo (JP)

(72) Inventors: Nobuaki Ito, Tokyo (JP); Hitoshi Donomae, Tokyo (JP); Kimihito Suzuki, Tokyo (JP); Kenji Nakao, Tokyo (JP); Toshio Isohara, Tokyo (JP)

(73) Assignees: NIPPON STEEL CORPORATION, Tokyo (JP); JFE STEEL CORPORATION, Tokyo (JP); KOBE STEEL, LTD., Kobe (JP); NISSHIN STEEL CO., LTD., Tokyo (JP); NIPPON STEEL ENGINEERING CO., LTD., Tokyo (JP)

( * ) Notice: Subject to any disclaimer, the term of this patent is extended or adjusted under 35 U.S.C. 154(b) by 273 days.

(21) Appl. No.: 16/075,552

(22) PCT Filed: Feb. 5, 2016

(86) PCT No.: PCT/JP2016/053573
§ 371 (c)(1),
(2) Date: Aug. 3, 2018

(87) PCT Pub. No.: WO2017/134829
PCT Pub. Date: Aug. 10, 2017

(65) Prior Publication Data
US 2019/0032160 A1 Jan. 31, 2019

(51) Int. Cl.
C21B 5/00 (2006.01)
C21B 5/06 (2006.01)

(52) U.S. Cl.
CPC ............. *C21B 5/001* (2013.01); *C21B 5/06* (2013.01); *C21B 2005/005* (2013.01); *C21B 2100/22* (2017.05); *C21B 2100/26* (2017.05)

(58) Field of Classification Search
CPC ........ C21B 2100/22; C21B 5/001; C21B 5/06
(Continued)

(56) References Cited

U.S. PATENT DOCUMENTS 2,337,551 A * 12/1943 Hansgirg ............... C21B 5/001
75/463
3,909,446 A * 9/1975 Miyashita ............... C01B 3/346
252/373

(Continued)

FOREIGN PATENT DOCUMENTS

EP 2719777 A1 4/2014
EP 2719778 A1 4/2014
(Continued)

OTHER PUBLICATIONS

Chinese Office Action and Search Report, dated Sep. 10, 2019, for corresponding Chinese Application No. 201680081079.2, with an English translation of the Office Action.
(Continued)

Primary Examiner — Jessee R Roe
Assistant Examiner — Michael Aboagye
(74) Attorney, Agent, or Firm — Birch, Stewart, Kolasch & Birch, LLP.

(57) ABSTRACT

The present invention provides a novel method for supplying a reducing gas to the shaft part of a blast furnace with which a large amount of reducing gas containing hydrogen at a high concentration can be supplied to a deeper position
(Continued)

in the blast furnace (location of the blast furnace closer to the center axis in the radial direction) and with which it is possible to reduce the total generated amount of $CO_2$ of the $CO_2$ amount that is reduced by conducting hydrogen smelting in the blast furnace and the $CO_2$ amount that is generated during production of the reducing gas supplied to the blast furnace. The method for supplying a reducing gas to the shaft part of a blast furnace according to the present invention is characterized by reforming coke oven gas by increasing the temperature thereof to 1200 to 1800° C. in a reactor in which an oxygen-containing gas is supplied to preheated coke oven gas to generate reformed gas in which hydrogen gas is enriched; mixing the reformed gas with CO-containing gas in the reactor so that the hydrogen concentration of the reducing gas is adjusted to 15-35 vol % (wet); and supplying the resultant reducing gas to the shaft part of the blast furnace under a condition of a ratio of a flow rate of reducing gas blown into shaft part/flow rate of reducing gas blown into tuyere >0.42.

15 Claims, 5 Drawing Sheets

(58) Field of Classification Search
USPC .......... 266/186, 197, 156, 155; 75/505, 495, 75/496, 497, 498, 796, 488
See application file for complete search history.

(56) References Cited

U.S. PATENT DOCUMENTS

| | | | |
|---|---|---|---|
| 4,235,604 A * | 11/1980 | Wagener | C01B 3/38 201/41 |
| 4,270,739 A | 6/1981 | Ahrendt et al. | |
| 4,376,648 A * | 3/1983 | Ohtawa | C21B 13/0073 75/498 |
| 6,143,053 A * | 11/2000 | Reidetschlager | C21B 13/146 75/444 |
| 9,127,326 B2 * | 9/2015 | Metius | C21B 5/001 |

FOREIGN PATENT DOCUMENTS

| | | |
|---|---|---|
| EP | 2719779 A1 | 4/2014 |
| JP | 37-8804 B | 7/1962 |
| JP | 47-33407 B1 | 8/1972 |
| JP | 49-15524 B1 | 4/1974 |
| JP | 2009-221547 A | 10/2009 |
| JP | 2011-212552 A | 10/2011 |
| JP | 2013-147692 A | 8/2013 |
| JP | 2013-185181 A | 9/2013 |
| JP | 2016-37624 A | 3/2016 |
| JP | 2016-50345 A | 4/2016 |
| WO | WO 2011/099070 A1 | 8/2011 |

OTHER PUBLICATIONS

Extended European Search Report, dated Aug. 26, 2019, for corresponding European Application No. 16889314.7.
International Search Report for PCT/JP2016/053573 dated May 10, 2016.
Kenichi et al., "Outline of COURSE50 and influence of injecting hydrogen gas into blast furnace", CAMP-ISIJ, 2010, vol. 23, p. 1025, total 3 pages.
Kenichi et al., "Reduction of sinter with injecting reformed or raw COG from tuyere", CAMP-ISIJ, 2012, vol. 25, p. 886, total 3 pages.
Matsuzaki et al., "Influence of injecting reformed-COG into blast furnace on diffusion behavior of gas", CAMP-ISIJ, 2010, vol. 23, p. 879, total 3 pages.

* cited by examiner

METHOD FOR SUPPLYING HYDROGEN-CONTAINING REDUCING GAS TO SHAFT PART OF BLAST FURNACE

FIELD

The present invention relates to a method of supplying a reducing gas containing hydrogen to a shaft part of a blast furnace in an ironmaking plant aimed at cutting the amount of $CO_2$ emitted from the ironmaking plant.

BACKGROUND

As one measure for dealing with global warming, cutting the amount of $CO_2$ emitted along with industrial production is being widely sought. As one part of this, to cut the $CO_2$ emitted in ironmaking operations using the blast furnace method, the art of manufacturing hydrogen gas and supplying this to the shaft part of the blast furnace to thereby reduce the iron ore by hydrogen and manufacture pig iron (that is, hydrogen smelting of the blast furnace) and thereby cut the amount of use of coke and other carbonaceous materials jointly used as the reducing material and fuel in the blast furnace (carbon input: amount of carbon charged when producing 1 ton of pig iron) is disclosed in NPTLs 1 and 2. Here, the reason why hydrogen gas is not supplied from the blast furnace tuyere, but from the shaft part is that the critical amount of particulate coal able to be supplied is usually blown in from the blast furnace tuyere. If in addition to this supplying hydrogen gas from the tuyere, blast furnace operation efficient not only in terms of spatial volume but also thermal terms would be difficult, so it is considered advantageous to supply hydrogen from the shaft part of the blast furnace where there is little residual oxygen and there is leeway in thermal terms.

As other prior art documents relating to the supply of gas to a blast furnace, PTLs 1 to 4 and NPTL 3 may be mentioned.

PTL 1 describes the art of steam reforming gas containing tar and methane using a catalyst so as to manufacture hydrogen.

PTL 2 describes the art of blowing a reducing gas containing hydrogen into the shaft part of a blast furnace during which adjusting the ratio of the amounts of iron ore and coke charged into the blast furnace in the direction of the furnace diameter so as to obtain suitable reduction and aeration inside the blast furnace.

PTL 3 describes the art of supplying natural gas or gas obtained by partial oxidation of refined COG (coke oven gas) from the shaft part of a blast furnace.

PTL 4 describes the art of supplying any of a nonreducing gas obtained by causing complete combustion of blast furnace gas etc. by air, a reducing gas obtained by indirectly heating blast furnace gas etc., or a reducing gas with a high concentration of hydrogen of a concentration of hydrogen of 65% as a preheated gas to the shaft part of the blast furnace.

NPTL 3 describes the result that even if supplying gas from the shaft part of a blast furnace in an experiment using a blast furnace model, the supplied gas does not reach the center part of the blast furnace.

CITATION LIST

Patent Literature

[PTL 1] Japanese Patent Publication No. 2011-212552A
[PTL 2] Japanese Patent Publication No. 2013-185181A
[PTL 3] Japanese Patent Publication No. 37-8804B2
[PTL 4] Japanese Patent Publication No. 2009-221547A

Nonpatent Literature

[NPL 1] CAMPS-ISIJ, vol. 23 (2010), pp. 1025
[NPL 2] CAMPS-ISIJ, vol. 25 (2012), pp. 886
[NPL 3] CAMPS-ISIJ, vol. 23 (2010), pp. 879

SUMMARY

Technical Problem

As a first problem of the prior art, in the state of the art relating to the supply of hydrogen gas to the shaft part of a blast furnace, there is the problem in particular of the unevenness of distribution of the rate of reduction of iron ore by the hydrogen gas inside the blast furnace.

This problem will be explained specifically.

The main iron ore reduction reaction inside a blast furnace is one where mainly CO gas reduces the iron oxide (iron ore) to produce metal iron. This reaction is an exothermic reaction. Further, the amount of heat required for heating the iron ore or direct reduction of the iron ore by carbon (endothermic reaction) is obtained by the latent heat of gas supplied from the tuyere (tuyere supplied gas=air etc.) and the heat of combustion when causing the coke or coal inside the blast furnace to burn by gas blown in from the tuyere (oxygen etc.) Further, the reduction of iron oxide by hydrogen gas is an endothermic reaction. Therefore, supplying only hydrogen gas from the shaft part of a blast furnace with no tuyere supplied gas to perform all of the reduction of the iron ore inside the blast furnace is impossible heat-wise. The amount of supply of hydrogen gas from the shaft part is limited to a value sufficiently smaller than the amount of the tuyere supplied gas. If supplying such a small amount of hydrogen gas directly from the shaft part of a blast furnace, as described in NPTL 3, the gas blown in from the shaft runs only near the walls inside the blast furnace. The iron ore is reduced by hydrogen only in this region. If the concentration of hydrogen gas becomes excessive near the furnace walls, due to the hydrogen reduction of the iron ore, the gas temperature will rapidly fall and the temperature required for reduction will no longer be able to be maintained, so to maintain a suitable concentration of hydrogen gas near the furnace walls, the possible amount of supply of hydrogen gas is only allowed to be a value further smaller than the above upper limit. Therefore, there is the problem that due to the restriction on the amount of supply of hydrogen gas, it is not possible to set the ratio of hydrogen reduction inside the blast furnace sufficiently high.

Further, as a second problem of the prior art, there is the problem of the $CO_2$ emitted at the time of manufacture of hydrogen. To supply a reducing gas containing the hydrogen necessary for hydrogen smelting in a blast furnace inexpensively and in a large amount, it is necessary to use hydrocarbons as the raw material for manufacturing it. In the conventional method for producing a reducing gas (hydrogen), there is the problem of $CO_2$ remaining in the reducing gas and large amounts $CO_2$ being emitted along with combustion of the fuel for supply of heat, so if totaling up the amount of $CO_2$ cut by the hydrogen smelting in the blast furnace and the amount of $CO_2$ emitted at the time of manufacture of the reducing gas supplied to the blast furnace, conversely the amount of emission of $CO_2$ increases and the hydrogen smelting performed to cut the $CO_2$ does not work. Such problems in hydrogen smelting conventionally were not recognized and no countermeasures were taken.

Furthermore, as a third problem of the prior art, there is the problem of the constituents of the reducing gas. Regarding the supply of the reducing gas to the shaft part of a blast furnace, in the prior art, it was believed that it was sufficient to simply contain hydrogen in a high concentration, but as a result of investigations by the inventors, it was learned that to actually supply gas to a shaft of a blast furnace to smoothly continue hydrogen smelting inside the blast furnace and cut the $CO_2$ emitted by the blast furnace, there are severe restrictions on the constituents of the reducing gas. In many prior art, it has been proposed to supply a reducing gas containing a large amount of a later explained unsuitable type of gas to the shaft part of a blast furnace. With such a method, the operation becomes impossible for a short period of time or the $CO_2$ emitted in the blast furnace cannot be cut.

The present invention, in consideration of the above situation, has as its object the provision of a novel method for supplying a reducing gas to a shaft part of a blast furnace with which it is possible to supply a large amount of reducing gas containing a high concentration of hydrogen to a deeper position inside the blast furnace (location of blast furnace closer to center axis in radial direction) and with which it is possible to cut the total amount of emission of $CO_2$ of the amount of $CO_2$ cut by the hydrogen smelting in the blast furnace and the amount of $CO_2$ emitted at the time of manufacture of the reducing gas and supplied to the blast furnace.

Solution to Problem

The gist of the method for supplying reducing gas to a shaft part of a blast furnace according to the present invention is as follows:

(1) A method for supplying a hydrogen-containing reducing gas to a shaft part of a blast furnace, the method comprising manufacturing a reducing gas by raising a temperature inside a reactor in which an oxygen-containing gas is supplied to a preheated coke oven gas to 1200 to 1800° C. to reform the coke oven gas and thereby produce reformed gas enriched in hydrogen gas, then mixing the CO-containing gas with that reformed gas in the reactor to adjust the concentration of hydrogen to 15 to 35 vol % (wet) and supplying the reducing gas to the shaft part of the blast furnace under a condition of a ratio of a flow rate of blowing the reducing gas to the shaft part/a flow rate of blowing a gas to the tuyere >0.42.

(2) The method for supplying a reducing gas to a shaft part of a blast furnace according to the above (1) wherein the oxygen-containing gas is oxygen gas and the method of reforming the gas by raising the temperature in the reactor to 1200 to 1800° C. is partial oxidation of the preheated coke oven gas.

(3) The method for supplying reducing gas to a shaft part of a blast furnace according to the above (1) wherein the oxygen-containing gas is steam produced by combustion of hydrocarbons and the method of reforming the gas by raising the temperature in the reactor to 1200 to 1800° C. is mixing combustion gas of the hydrocarbons with the preheated coke oven gas.

As more specific methods, for example, there are ones such as the following:

[1] The method according to the above (1) further comprising:
a) a step of raising the pressure of the coke oven gas,
b) a step of adjusting a flow rate of the coke oven gas,
c) a step of preheating the coke oven gas, and
d) a step of raising the temperature of the preheated coke oven gas inside the reactor in which oxygen gas is supplied to 1200 to 1800° C. and reforming the gas by partial oxidation to produce reformed gas enriched in hydrogen gas, then mixing into that reformed gas the CO-containing gas in the reactor to adjust the concentration of hydrogen of the reformed gas to 15 to 35 vol % (wet) and the temperature to 800 to 1000° C. to produce reforming-use hydrogen gas for supply to the shaft part of the blast furnace.

[2] The method according to the above [1] wherein a concentration of CO in the CO-containing gas is 50 vol % to less than 99 vol % (dry), a concentration of $CO_2$ is 0 vol % (dry) to less than 1 vol % (dry), a concentration of $H_2$ is 0 vol % (dry) to less than 35 vol % (dry), and a concentration of $N_2$ is 1 vol % (dry) to less than 20 vol % (dry).

[3] The method according to the above [1] or [2] wherein the CO-containing gas is blast furnace gas, converter gas, or synthesis gas treated to remove $CO_2$.

[4] The method according to any one of the above [1] to [3] wherein the hydrogen-enriched reformed gas contains a hydrocarbon gas in an amount of 1% to 5%.

[5] The method according to any one of the above [1] to [4] wherein a flow rate of supply (mol/s) of the oxygen gas is 0.4 to less than 0.5 time the flow rate of supply (mol/s) of carbon atoms contained in the hydrocarbons in the coke oven gas.

[6] The method according to any one of the above [1] to [5] wherein as the coke oven gas, reformed coke oven gas obtained by treating crude coke oven gas, obtained from a coke oven provided with means for reducing a moisture in crude coke oven gas emitted, in a carbonization furnace held at 700° C. or more to break down the hydrocarbons in the crude coke oven gas is used.

[7] The method according to any one of the above [1] to [6] wherein the step of raising the pressure of the coke oven gas and the step of adjusting the flow rate of the coke oven gas are performed in that order or in reverse order before the step of preheating the coke oven gas.

[8] The method according to the above (1) further comprising
a) a step of running coke oven gas from the coke oven through a carbonization furnace and breaking down the hydrocarbons in the coke oven gas into coke and hydrogen to thereby make the concentration of hydrogen increase,
b) a step of removing the tar and at least part of the moisture in the gas run through the carbonization furnace to manufacture a first reformed gas,
c) a step of raising the pressure of the first reformed gas,
d) a step of preheating the raised pressure first reformed gas,
e) a step of supplying the preheated first reformed gas to a partial oxidation reforming apparatus and supplying combustion gas to that partial oxidation reforming apparatus to further reform the hydrocarbons in the first reformed gas to make the concentration of hydrogen increase to manufacture a second reformed gas, and
f) a step of supplying the second reformed gas from a gas supply port leading to the shaft part of the blast furnace to the inside of the blast furnace.

[9] The method according to the above [8] further comprising raising the pressure of the first reformed gas to at least 0.2 MPa in pressure.

[10] The method according to the above [8] or [9] further comprising preheating the first reformed gas to 800° C. to 1000° C.

[11] The method according to any one of the above [8] to [10] further comprising supplying combustion gas to the partial oxidation reforming apparatus by
(i) supplying combustion gas obtained by supplying oxygen gas and flammable gas to a burner,
(ii) supplying oxygen gas and flammable gas to the partial reforming apparatus to generate combustion gas inside that partial oxidation reforming apparatus and supplying the same, or
(iii) supplying oxygen gas to the inside of the partial oxidation reforming apparatus to make part of the first reformed gas burn and supplying the same.

[12] The method according to any one of the above [8] to [11], further comprising, before preheating the first reformed gas, temporarily holding the raised pressure gas in a gas holder and further raising the pressure of the gas from this gas holder.

Next, characterizing features of the present invention will be explained.

Characterizing Feature 1 of Present Invention

As described in the NPTL 1, in the prior art, even if supplying reformed COG or other reducing gas containing hydrogen in a high concentration to the shaft part of a blast furnace, the supplied reducing gas ends up running only near the inside walls of the blast furnace. For this reason, the supplied reducing gas can only reduce the iron ore near the inside walls of the blast furnace. In this state, even if increasing the amount of supply of the reducing gas (flow rate of supply of hydrogen gas), due to the effect of the increase in heat absorption at the time of reducing the iron ore, it is not possible to maintain the temperature required for the reduction reaction inside the blast furnace and there is the problem of the increase in the supplied hydrogen gas ending up being exhausted from the top of the blast surface without being used for hydrogen smelting. That is, the upper limit of the flow rate of supply of hydrogen gas allowed in the prior art was low.

Therefore, the present invention partially oxidizes COG containing a high concentration of hydrogen gas, mixes the high temperature partially oxidized gas with blast furnace gas or other CO-containing gas not containing almost any hydrogen gas and not high in temperature (for example, 300° C. or less) to suitably reduce the hydrogen gas concentration, then increases the ratio of the flow rate of gas supplied to the shaft part to the flow rate of gas supplied from the tuyere (ratio of flow rate in blowing in reducing gas/flow rate in blowing a gas to tuyere) to thereby cut the amount of heat absorption due to the reduction of iron ore near the inside walls of the blast furnace and make the heat capacity of the supplied reducing gas increase to enable hydrogen to reach a deeper part of the blast furnace close to the center part. In particular, the inventors discovered that by making the ratio of the flow rate in blowing in reducing gas/flow rate in blowing a gas to the tuyere >0.42 and setting the concentration of hydrogen gas in the reducing gas to 15 to 35 vol % (wet), it is possible to increase the flow rate of the hydrogen gas contained in the reducing gas supplied to the shaft part of a blast furnace compared with the prior art. As a result, in the present invention, by making the ratio of hydrogen smelting in reduction of iron ore in the blast furnace increase, it is possible to cut the $CO_2$ exhausted from the blast furnace.

Characterizing Feature 2 of Present Invention

The inventors learned, as a result of their investigations, that there are the following restrictions on the constituents sought from the reducing gas supplied to the shaft part of a blast furnace for hydrogen smelting use.

A first restriction is that the methane and other hydrocarbons have to be 2.5 vol % or less. This is because at the temperature at the shaft part of a blast furnace, part of such hydrocarbons will decompose by heat and produce solid carbon (coke). If the concentration of the supply of hydrocarbons is excessive, coke will deposit in the spaces between material charged into the blast furnace and clog the channels giving rise to the problem of difficult continuation of blast furnace operation.

A second restriction is that almost no $CO_2$ must be contained. This is because most of the $CO_2$ supplied to the shaft part of a blast furnace is exhausted as is from the top of the blast furnace without being used for a reaction inside the blast furnace whereby the amount of $CO_2$ exhausted from the blast furnace is made to directly increase.

A third restriction is that it is necessary that the concentration of steam be sufficiently small (for example, 10 vol % or less). This is because, in the shaft part of a blast furnace, steam is a substance which can oxidize the CO inside the blast furnace and emit $CO_2$ and the majority of it is not used for any reaction inside the blast furnace, so if supplying it in an excessively high concentration, the concentration of the reducing substance in the reducing gas ($H_2$ or CO) is lowered and the speed of the reduction reaction of the iron ore in the blast furnace is lowered.

Similarly, from the viewpoint of not causing a drop in concentration of the reducing substance in the reducing gas, the concentration of nitrogen gas or other substances not reacting much at all in the shaft part of a blast furnace becoming excessively high (for example, 20% or more) must also be avoided.

In the prior art, for example, it has been proposed to directly supply COG to the shaft part of a blast furnace, but COG usually contains about 30% of methane gas, so due to the above first restriction, such a gas is not a constituent suitable as a reducing gas to be supplied to the shaft part of a blast furnace.

Further, if using gas obtained by steam reforming natural gas or COG as the reducing gas, addition of a large amount of steam would be unavoidable (or in a usual coke oven, crude COG inherently contains a large amount of 10% or more of steam), so the reformed gas would contain for example a large amount of 20% or more of $CO_2$ and 50% or more of steam. Such a gas is not suitable in view of the above second and third restrictions.

Furthermore, in the prior art of adding oxygen to a raw material of naphtha or natural gas or other hydrocarbons at ordinary temperature or preheated to a relatively low temperature (for example 300° C.) and supplying the partially oxidized gas to the shaft part of a blast furnace as well, the general practice is to simultaneously add steam to promote the reformation of the hydrocarbons, so this is not suitable due to above third restriction. Even if not using steam, it is necessary to add a large amount of oxygen gas (for example $O_2/C=0.7$) so as to raise the temperature of the raw material gas to a temperature sufficient for oxidation. In this regard, in such a partial oxidation reaction of hydrocarbons, not including hydrocarbons but including only CO as an oxide is the ideal operating condition from the viewpoint of the above restrictive conditions on the constituents. The specific condition is $O_2/C=0.5$. In the above prior art, the partial oxidation reaction becomes one under the condition of excess oxygen (that is, $O_2/C>0.5$), so at the time of partial oxidation, several % to 10% or more of $CO_2$ is generated, so this is not suitable from the above second or third restriction. In the prior art, to cut the $CO_2$ emitted in the partial oxidation, setting the reaction temperature higher and operating in a temperature region where $CO_2$ cannot be emitted in an equilibrium state is aimed at. However, for this, in the past, the method of increasing the amount of supply of $O_2$ to make the amount of temperature rise increase was employed, so the amount of supply of $O_2$ became further excessive. As a result, the excessive oxygen formed not $CO_2$, but formed $H_2O$ resulting in emission of a large amount of $H_2O$, so $O_2$ is not a suitable constituent from the above third restriction.

In the present invention, COG is partially oxidized to cut the hydrocarbons in the COG. At that time, to suppress the emission of $CO_2$ and $H_2O$, $O_2/C$ is cut more than in the prior art. In particular, by performing partial oxidation under conditions of less oxygen than the above ideal $O_2/C$ ratio (0.5), it is possible to avoid the emission of $CO_2$. Under such partial oxidation conditions, the amount of $O_2$ added is relatively small, so the amount of temperature rise due to the heat of the partial oxidation reaction is smaller than the prior art, the temperature able to be reached after partial oxidation becomes lower than the prior art, and the hydrocarbons in the COG cannot be completely broken down. However, in the present invention, the inventors discovered that the above first to third restrictions can be satisfied by operation under conditions combining the conditions of making the $O_2/C$ a ratio of 0.4 to less than 0.5, making the preheating temperature of the COG a much higher one than the prior art of 800 to 1000° C., not adding steam at the time of partial oxidation, mixing the high temperature gas obtained by partial oxidation of COG with non-high temperature CO-containing gas, and more preferably using reformed COG obtained by decomposing and reforming by a carbonization furnace the high temperature crude COG exhausted as COG from a coke oven provided with means for reducing the moisture.

At the partial oxidation reaction temperature or more, by making the $O_2/C$ ratio in the partial oxidation 0.4 to less than 0.5, it is possible to break down about 80% or more of the hydrocarbons initially contained in the COG. Further, by using the above reformed COG, the concentration of hydrocarbons in the initial COG is diluted by the $H_2$ or CO gas emitted by the decomposition and reforming operation and it is possible to greatly reduce the concentration of hydrocarbons in the raw material gas of the partial oxidation. Furthermore, by not adding steam at the time of partial oxidation, it is possible to avoid inclusion of excessive $H_2O$ in the reducing gas. By mixing the high temperature gas obtained by partial oxidation of the thus obtained COG with the non-high temperature CO-containing gas, it is possible to greatly reduce the concentration of hydrocarbons remaining in the partially oxidized gas. Regarding the point of insufficient amount of temperature rise due to the heat of partial oxidation reaction, the minimum extent of preheating is performed so as to obtain the lower limit temperature under conditions where the reforming reaction temperature can be maintained during the steam reforming reaction (endothermic reaction) where the peak temperature at the time of the partial oxidation can continue after the partial oxidation. The inventors discovered, as a result of their investigations, that preheating at 800 to 1000° C. under the above $O_2/C$ condition is suitable.

According to the present invention, by minimizing the $CO_2$ and $H_2O$ used as the reducing gases supplied to the shaft part of a blast furnace by rendering the $O_2/C$ ratio a region where the oxygen is stoichiometrically insufficient (that is, $O_2/C<0.5$) or by performing the reforming reaction after partial oxidation in the nonequilibrium reaction temperature region (that is, by an average temperature during the reforming reaction lower than the past), it first became possible to manufacture the required constituents by a single process. As opposed to this, in the prior art, the orientation is toward complete decomposition of the hydrocarbons by partial oxidation. It would have been difficult for a person skilled in the art to have conceived of a method for manufacturing a reducing gas like in the present invention.

Further, $H_2O$ and $CO_2$ in principle can be removed after partial oxidation, but additional steps unavoidably consuming large amounts of energy (that is, emitting large amounts of $CO_2$) are necessary. This is not preferable from the viewpoint of decreasing $CO_2$ emissions.

Characterizing Feature 3 of Present Invention

In the present invention, reducing gas of conditions of constituents, temperature, and pressure suitable as the above reducing gas for supply to the shaft part of a blast furnace can be produced under conditions enabling the total amount of $CO_2$ of the amount of $CO_2$ cut by hydrogen smelting at the blast furnace and the amount of $CO_2$ emitted at the time of manufacture of the reducing gas to be cut.

In the prior art, the total amount of $CO_2$ of the amount of $CO_2$ cut by hydrogen smelting at the blast furnace and the amount of $CO_2$ emitted at the time of manufacture of the reducing gas was not considered. What kind of process to use to enable the above total amount of $CO_2$ emitted to be cut was not known at all. For this reason, the art of the hydrogen smelting at conventional blast furnaces supplying reducing gas to the shaft part of a blast furnace was not able to cut the above total amount of $CO_2$ emitted at all.

As the method of evaluating the above total amount of $CO_2$ emitted, $\Delta CO_2$ can be used. $\Delta CO_2$ is the ratio of the $CO_2$ volume flow rate and $H_2$ volume flow rate. In hydrogen smelting of a blast furnace, the $CO_2$ volume flow rate is the amount of $CO_2$ emitted cut by the hydrogen smelting (negative sign), while the $H_2$ volume flow rate is the flow rate of $H_2$ in the reducing gas supplied (positive sign). In the manufacture of the reducing gas, the $CO_2$ volume flow rate is the total of the flow rate of hydrogen remaining in the reducing gas and the flow rate of $CO_2$ emitted as a constituent of the combustion gas in the case of converting the heat energy required at the time of manufacture of the reducing gas to the heat of combustion of natural gas (natural gas is considered to be the lowest in amount of $CO_2$ emitted per amount of heat emitted in industrial hydrocarbon fuels) (positive sign), while the $H_2$ volume flow rate is the $H_2$ flow rate in the reducing gas supplied (positive sign). It is known from the test results in hydrogen smelting that the $\Delta CO_2$ in a blast furnace is about −0.16. Further, unless otherwise indicated, the "volume flow rate" in this Description is the rate converted to the standard state of gas.

In the present invention, the $H_2O$ of the source of emission of $CO_2$ is removed as much as possible at the time of reforming the COG, so by using crude COG emitted using a coke oven provided with means for reducing the moisture and breaking down mainly the tar in this crude COG in a carbonization furnace without adding steam, it is possible to manufacture reformed COG with small concentrations of $CO_2$ and $H_2O$. Along with this, since the crude COG breaks down by heat while high in temperature, heat for raising the temperature of the raw material gas is unnecessary and a large amount of heat of reaction such as in a steam reforming reaction is not needed, so the amount of $CO_2$ emitted at the time of manufacture of the reformed COG is a small amount of less than a fraction of steam reforming or other prior methods. Further, regarding the oxygen gas of the other sources of emission of $CO_2$, by making the flow rate of supply at the time of partial oxidation the smallest extent, it is possible to minimize the concentration of $CO_2$ in the gas after the partial oxidation, so the energy required at the time of manufacture of the supplied $O_2$ is also small and the manufactured reducing gas can be supplied to the blast furnace in the state of the high temperature, so energy for reheating is also not necessary. Therefore, even if considering the increase in $CO_2$ emitted due to preheating the raw material gas up to a somewhat high temperature at the time of partial oxidation, the amount of $CO_2$ emitted due to the manufacture of the reducing gas using this reformed COG as a raw material is much smaller than a conventional method. For example, the typical $\Delta CO_2$ in the present invention is 0.1 or less. It is therefore possible to cut the amount of $CO_2$ emitted totaled with the amount of $CO_2$ cut by hydrogen smelting in the blast furnace.

On the other hand, for example, if using natural gas or COG steam reformed as the reducing gas, not only are the constituents inherently not suitable, but also the amount of $CO_2$ emitted becomes excessive, so the result cannot be used as a reducing gas. In a typical example calculated by the inventors, the $\Delta CO_2$ was an extremely large 0.7 or so and the $CO_2$ emitted at the time of manufacture of the reducing gas exceeded the absolute value of the effect of cutting the $CO_2$ due to the hydrogen smelting at the blast furnace ($\Delta CO_2 = -0.16$), so even if using such reducing gas, it is not possible to cut the total amount of $CO_2$ emitted.

Advantageous Effects of Invention

According to the present invention, it is possible to supply hydrogen gas for reduction use to a deeper position inside a blast furnace (location of blast furnace nearer center axis in radial direction) and thereby possible to solve the problem of uneven distribution of the rate of reduction of iron ore in a blast furnace using hydrogen gas, so it is possible to supply a greater amount of hydrogen gas to the blast furnace as raw material for hydrogen smelting use and, as a result, it is possible to cut the $CO_2$ emitted at the blast furnace. Further, it is possible to manufacture the reducing gas by the constituents, temperature, and pressure suitable as reducing gas for hydrogen smelting use supplied to the shaft part of a blast furnace. Furthermore, it is possible to cut the $CO_2$ emitted in the manufacture of reducing gas containing hydrogen gas. As a result, it is possible to cut the total amount of $CO_2$ of the amount of $CO_2$ emitted to be cut at the blast furnace and the amount of $CO_2$ emitted when manufacturing the reducing gas.

DESCRIPTION OF EMBODIMENTS

Figure 1:
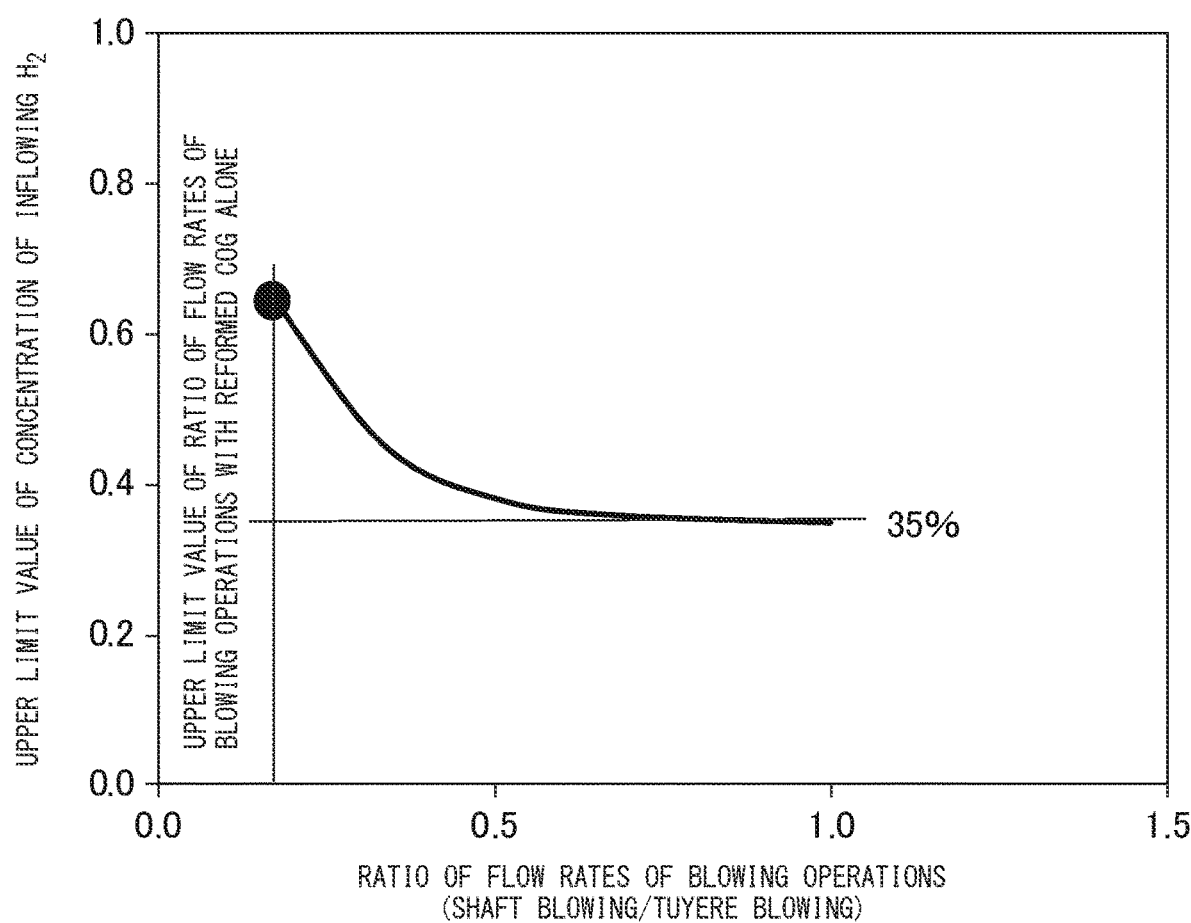
FIG. 1 is a graph for explaining the relationship between a ratio of a flow rate of blowing gas to the shaft part of a blast furnace and an upper limit value of a concentration of $H_2$ flowing into the shaft part of a blast furnace.

In the present invention, reducing gas adjusted to a concentration of hydrogen of 15 to 35 vol % (wet) is supplied to the shaft part of a blast furnace under the condition of a ratio of a flow rate in blowing reducing gas to the shaft part/flow rate in blowing a gas to the tuyere>0.42. As the reducing gas supplied to the shaft part, it is preferable to use gas obtained by heat treating coke oven gas to reform it and manufacture low CO concentration and high $H_2$ concentration gas and diluting it to adjust the concentration of hydrogen.

Here, the process performed by the inventors in perfecting the present invention will be explained in brief.

The hydrogen-containing reducing gas adjusted to a temperature suitable as a reducing gas to be supplied to the shaft part of a blast furnace (in the following explanation, sometimes simply referred to as the "reducing gas") is supplied to the shaft part of a blast furnace (part configured by providing plurality of through holes around shaft of blast furnace and supplying reducing gas there). For the structure and materials of the shaft part of a blast furnace, ones of the prior art can be applied.

1) Constituents of Reducing Gas and Method of Calculating Temperature
Reforming Reaction
The reforming reaction predicated upon for obtaining the reducing gas used in the present invention is as follows if taking the example of methane as the hydrocarbons of the raw material:

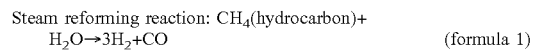
Steam reforming reaction: $CH_4$(hydrocarbon)+ $H_2O \rightarrow 3H_2 + CO$ (formula 1)

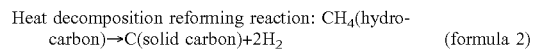
Heat decomposition reforming reaction: $CH_4$(hydrocarbon)$\rightarrow$C(solid carbon)+$2H_2$ (formula 2)

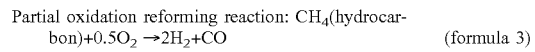
Partial oxidation reforming reaction: $CH_4$(hydrocarbon)+$0.5O_2 \rightarrow 2H_2 + CO$ (formula 3)

Further, if using coke oven gas as the raw material, the partial oxidation reaction of formula 3 is generally made a general reaction in which the reaction of the formula 1 continues after the following reaction:

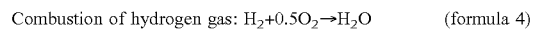
Combustion of hydrogen gas: $H_2 + 0.5O_2 \rightarrow H_2O$ (formula 4)

In addition to this, as the main reaction in which hydrogen gas is increased and decreased, there is the following:

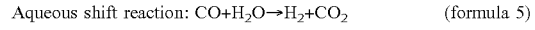
Aqueous shift reaction: $CO + H_2O \rightarrow H_2 + CO_2$ (formula 5)

The solid carbon generated in the heat decomposition reforming reaction is mainly coke. This contains some hydrogen in addition to carbon, so the right side of the heat decomposition reforming reaction strictly speaking is "$C_nH_m$ (solid carbon)", but in general, n>m, so for simplification of the explanation, the expression of formula 2 is used.

Composition of Reformed Gas at Time of Partial Oxidation Reforming Reaction

The gas can be sampled at an exit side of the partial oxidation apparatus and its composition found using gas chromatography etc. Here, the hydrocarbon (for example, methane) decomposition rate is defined as the ratio of the volume flow rate of the hydrocarbons contained in the gas after partial oxidation (converted to standard state) to the volume flow rate of hydrocarbons contained in the raw material gas (converted to standard state). For example, "methane decomposition rate 70%" means 30% of the methane present in the raw material gas remains in the reformed gas.

It is known that the constituents of the gas obtained by a partial oxidation reforming reaction or steam reforming reaction (no catalyst) of hydrocarbons under conditions greatly exceeding 1000° C. are close to the equilibrium composition of the reaction end temperature (substantially reactor exit side temperature) if providing a sufficient residence time of the gas in the reactor. Therefore, by calculating the equilibrium constituents, it is possible to evaluate the reforming performance of the partial oxidation reaction and steam reforming reaction (no catalyst) under conditions greatly exceeding 1000° C. Further, a thermocouple or other thermometer is provided inside the partial oxidation apparatus to measure the peak temperature.

2) Method of Evaluation of Effect of Blowing Reducing Gas into Shaft of Blast Furnace A test was run blowing hydrogen gas into the blast furnace shaft of a test blast furnace. To reproduce the results, a numerical simulation of the flow of gas inside the blast furnace was performed. This simulation was used to calculate and evaluate the flow of gas inside the blast furnace under various blowing conditions.

Method of Simulation

Numerical simulation was performed simulating the dimensions and shape of a test blast furnace. This is a technique of direct solution by setting discrete equations of motion and equation of energy of a fluid. With this technique, it is possible to individually set the conditions for supply of gas to the blast furnace tuyere and the conditions for supply of gas to the shaft part of a blast furnace. At the test blast furnace, as described in PTL 2, the phenomenon of the gas blown into the shaft part rising only near the furnace walls was confirmed. To reproduce this flow, various parameters were adjusted to secure the precision of the numerical simulation.

The flow rate of hydrogen gas for supply to the shaft part/flow rate of gas for supply to the tuyere was simulated under various conditions and the depth in the blast furnace reached by the hydrogen gas supplied to the shaft part and the distribution of concentration of the hydrogen gas supplied to the shaft part in a blast furnace were found.

3) Behavior of Reducing Gas Inside Blast Furnace

The upper limit of the flow rate of $H_2$-containing gas (reformed COG etc.) blown into the shaft part in the test blast furnace is defined by the amount of drop of local temperature accompanying reduction (endothermic reaction) at a certain location inside the blast furnace (near furnace walls) due to $H_2$ reduction. If blowing gas by more than the upper limit of the inflowing flow rate (flow rate of gas blown into shaft), the concentration of $H_2$ at a certain location will become excessive and a temperature enabling reduction will no longer be able to be maintained there, so $H_2$ reduction will stop and the effect of reduction of the carbon input (effect of reduction of amount of carbon input when producing 1 ton of pig iron—this being an important factor in measures against global warming) will no longer be improved. Further, at this time, the majority of the $H_2$ supplied to the shaft part is wastefully discharged from the top of the blast furnace without participating in any reaction. In the tests at the test blast furnace, in tests where the effect of reduction of the carbon input could be sufficiently observed due to the effect of hydrogen reduction inside the blast furnace, it is conceivable that the concentration of $H_2$ at a certain location was not excessive, so the concentration of $H_2$ at a certain location in conditions resulting in the maximum flow rate of gas blown into the shaft of a blast furnace among such test conditions can be defined as the upper limit value of the concentration of $H_2$ at the shaft part at a certain location. Measurement inside the blast furnace is difficult, so the upper limit of concentration of $H_2$ cannot be directly measured, so the average concentration of $H_2$ in a predetermined region near the furnace walls of a region where the $H_2$ gas in the reducing gas supplied from the shaft part passes when supplying reducing gas for supply to the shaft part to the shaft part of a blast furnace is calculated from the results of a numerical simulation of the flow inside the blast furnace reproducing the test under the maximum condition of the inflowing flow rate. The value of this average concentration of $H_2$ can be made the upper limit value of the concentration of $H_2$ at the shaft part. As the predetermined region for obtaining an average of the concentration of $H_2$ near the furnace walls, for example, outside by 95% of the inside diameter of the blast furnace is possible. As a result of running the above simulation based on the test results in the test blast furnace, it was discovered that the upper limit value of the concentration of $H_2$ at the shaft part is 35%. The concentration of $H_2$ in the inflowing gas (concentration of inflowing $H_2$) can change in various ways due to differences in the raw material gas etc., but as an indicator for maintaining a good $H_2$ reduction reaction in a blast furnace, as explained above, it was learned that it is sufficient to set the operating conditions so that the upper limit concentration of $H_2$ at the shaft part becomes 35% or less. That is, if the upper limit value of the concentration of $H_2$ at the shaft part or less inside the blast furnace, it can be judged that the endothermic reaction at the time of hydrogen reduction is not excessive and that hydrogen reduction is proceeding well at that location.

The concentration of reducing gas inside the blast furnace when making the flow rate of hydrogen gas (reducing gas) for supply to the shaft part of the blast furnace increase more can be found by a similar numerical simulation. If using the calculated value of the concentration of reducing gas in this region near the furnace walls so as to set the concentration of $H_2$ in the reducing gas so that the average concentration of $H_2$ at the above region near the furnace walls (at time corresponding to flow rate of reducing gas supplied at the test blast furnace) becomes not more than the upper limit value of the concentration of $H_2$ at the shaft part, hydrogen reduction in the blast furnace becomes possible (this is because at the deeper part of the blast furnace, the concentration of $H_2$ falls from that at the region near the furnace walls, so the effect of the endothermic reaction at the time of hydrogen reduction becomes smaller). At this time, the upper limit value of the flow rate of supply of $H_2$ in the reducing gas to the shaft part of the blast furnace can be found by

[Upper limit value of concentration of $H_2$ in reducing gas(upper limit value of concentration of inflowing $H_2$)]×[Flow rate of supply of reducing gas(inflowing gas)].

Even if the allowed concentration of $H_2$ at the shaft part is constant, the upper limit value of the concentration of inflowing $H_2$ will change depending on the flow rate of the reducing gas. The relationship of the upper limit value of the concentration of inflowing $H_2$ (upper limit value of concentration of $H_2$ in reducing gas) to the ratio of flow rates of blowing operations (=[flow rate of gas flowing in (blown into shaft)]/[flow rate of gas blown into tuyere]) will be explained using FIG. 1. In the figure, the black dot is the test point, in the test of supplying reformed COG independently to the shaft part in the test blast furnace, showing the concentration of inflowing $H_2$ of the upper limit possible under the condition of the maximum flow rate of blowing gas to the shaft (in the figure, the "UPPER LIMIT VALUE OF RATIO OF FLOW RATES OF BLOWING OPERATIONS WITH REFORMED COG ALONE"). In the figure, the curve of the upper limit value of the concentration of inflowing $H_2$ passes through this test point. The supplied hydrogen gas (reducing gas) blown into the blast furnace from the shaft part is quickly mixed with the rising flow derived from the gas blown in from the tuyere in the region near the walls of the blast furnace resulting in the concentration of $H_2$ falling compared with that in the inflowing gas. In general, if making the flow rate of reducing gas containing $H_2$ blown in from the shaft part (flow rate of inflowing gas) increase, this effect of mixing is reduced and the concentration of $H_2$ near the wall surfaces increases. For this reason, to obtain the allowed concentration of $H_2$ at the shaft part or less, it is necessary to further decrease the concentration of $H_2$ in the inflowing gas. The upper limit value of the concentration of inflowing $H_2$ falls. For this reason, if supplying to the shaft part just partially oxidized or otherwise reformed gas of reformed COG or refined COG, in which the value of the concentration of $H_2$ is substantially fixed, it is not possible to make the flow rate of inflowing gas increase to at least the condition at the test blast furnace. To make the flow rate of inflowing gas increase more than this, it is necessary to dilute the reformed gas to lower the concentration of $H_2$ in the inflowing gas. In FIG. 1, the upper limit value of the concentration of inflowing $H_2$ falls along with the increase in the flow rate of gas blown into the shaft part (increase in ratio of flow rates of blowing operations) and gradually approaches the upper limit value of the concentration of $H_2$ at the shaft part (35%). This gradually approached value (35%) of the upper limit value of the concentration of inflowing $H_2$ will be called the "critical upper limit value of the concentration of inflowing $H_2$". If the ratio of flow rates of blowing operations is particularly large, the reducing gas near the furnace walls of the blast furnace will not be diluted much at all by the gas blown into the tuyere, so the upper limit value of the concentration of $H_2$ at the shaft part will become the upper limit value of the concentration of inflowing $H_2$ as it is (critical upper limit value of concentration of inflowing $H_2$). Further, if there are special circumstances such as convenience in work, the concentration of $H_2$ in the inflowing gas may be made a concentration of less than the upper limit value.

Figure 2:
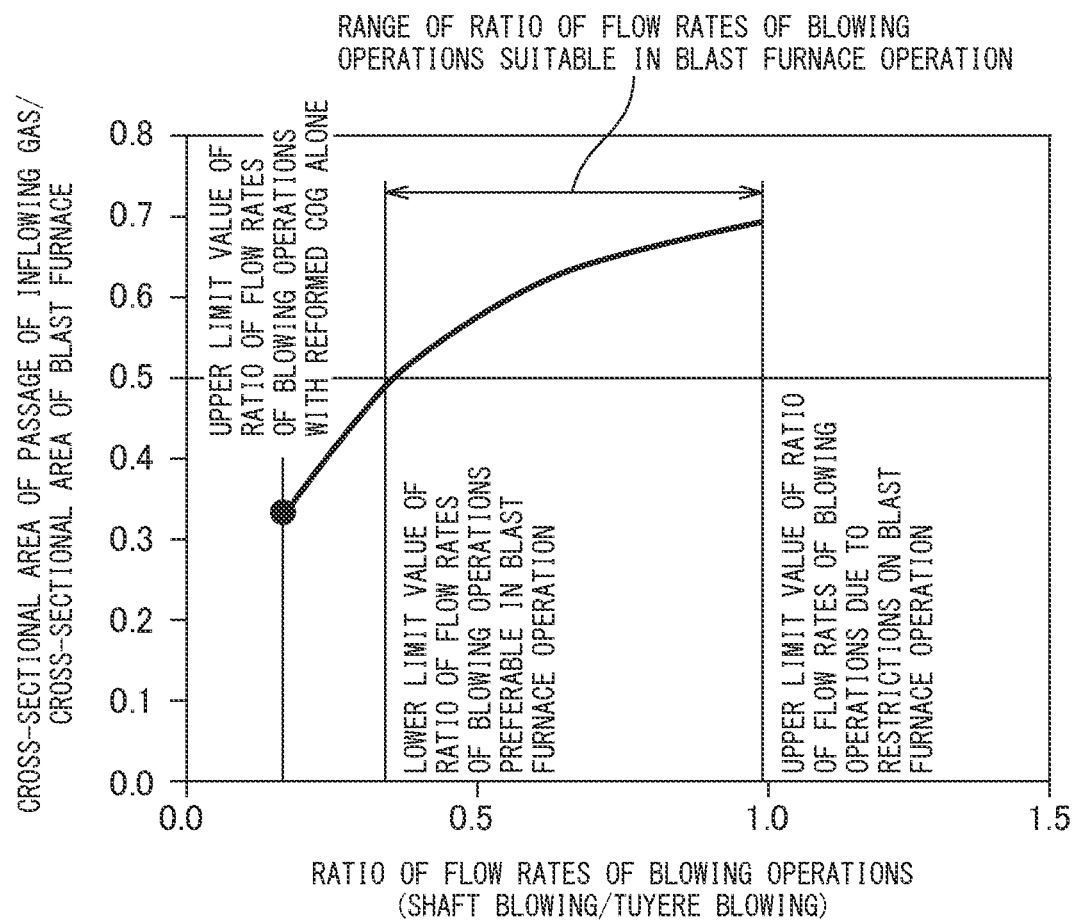
FIG. 2 is a graph for explaining a range of the ratio of a flow rate of blowing gas to the shaft part of a blast furnace suitable for blast furnace operation.

As shown in FIG. 2, the ratio of flow rates of blowing operations is made to increase to thereby make the cross-sectional area of passage in the blast furnace of inflowing gas supplied from the shaft increase more. That is, it is possible to make the reducing gas reach a deeper location inside the blast furnace (closer to center axis of blast furnace). However, there are restrictions in blast furnace operations on the ratio of flow rates of blowing operations. If blowing in reducing gas from the shaft part, from the viewpoint of uniformity of the hydrogen reduction reaction inside the blast furnace, the cross-sectional area of passage of the reducing gas (horizontal plane) is preferably at least 50% of the cross-sectional area of the blast furnace (horizontal plane) (see FIG. 2, "LOWER LIMIT VALUE OF RATIO OF FLOW RATES OF BLOWING OPERATIONS PREFERABLE IN BLAST FURNACE OPERATION"). In fact, even with a ratio of flow rates of blowing operations below this such as in a test blast furnace, operation of the blast furnace is not impossible, but if the hydrogen reduction region remains at a certain location near the furnace walls, the difference in temperature distribution in the furnace will increase. This is not preferable from the viewpoint of the stability of operations. The cross-sectional area of passage of the inflowing gas is found from the results of the above-mentioned numerical simulation and was defined as the region of concentration of inflowing gas of 10% or more at the top end of the material charged into the blast furnace. On the other hand, from the viewpoint of operation stability, the ratio of the flow rate of inflowing gas from the shaft part and the flow rate of gas blown into the tuyere (ratio of flow rates of blowing operations) has to be 1 or less (see "UPPER LIMIT VALUE OF RATIO OF FLOW RATES OF BLOWING OPERATIONS DUE TO RESTRICTIONS ON BLAST FURNACE OPERATION" in FIG. 2). This is because if a ratio of flow rates of blowing operations greater than this, the amount of heat supplied due to the gas supplied from the tuyere becomes insufficient and the blast furnace operation becomes unstable. Therefore, the region in FIG. 2 between the "LOWER LIMIT VALUE OF RATIO OF FLOW RATES OF BLOWING OPERATIONS PREFERABLE IN BLAST FURNACE OPERATION" and the "UPPER LIMIT VALUE OF RATIO OF FLOW RATES OF BLOWING OPERATIONS DUE TO RESTRICTIONS ON BLAST FURNACE OPERATION" is the range of ratio of flow rates of blowing operations suitable in blast furnace operation. Further, the "UPPER LIMIT VALUE OF RATIO OF FLOW RATES OF BLOWING OPERATIONS WITH REFORMED COG ALONE" in FIG. 2 shows the upper limit value of the flow rate of inflowing gas in the prior art (results of test blowing reformed COG into shaft part of test blast furnace—corresponding to test point in FIG. 1) and is not necessarily a suitable condition in blast furnace operation.

Furthermore, in terms of the object of the present invention, it is advantageous to increase the flow rate of $H_2$ supplied to the shaft part of a blast furnace. From this viewpoint, there is a further restrictive condition on the concentration of inflowing $H_2$. This restrictive condition will be explained using FIG. 3. Along with increasing the ratio of flow rates of blowing operations (ratio of flow rate of gas flowing in from shaft part and flow rate of gas blown in from tuyere), the flow rate of $H_2$ able to be supplied from the shaft part to the inside of the blast furnace together with the inflowing gas (upper limit value of flow rate of inflowing $H_2$) increases (see curve of "TIME OF UPPER LIMIT OF CONCENTRATION OF INFLOWING $H_2$" in FIG. 3). However, when increasing the flow rate of inflowing gas from the inflowing gas conditions of the reformed gas containing a high concentration of $H_2$ (reformed COG or COG partial oxidation reformed gas etc.) alone, as shown in FIG. 1, near the "UPPER LIMIT VALUE OF RATIO OF FLOW RATES OF BLOWING OPERATIONS WITH REFORMED COG ALONE", the allowed upper limit value of the concentration of the inflowing $H_2$ rapidly falls cancelling out the majority of the effect of increase of the upper limit of the flow rate of the inflowing $H_2$ due to the increase in flow rate of the inflowing gas, so near the "UPPER LIMIT VALUE OF RATIO OF FLOW RATES OF BLOWING OPERATIONS WITH REFORMED COG ALONE", even if increasing the ratio of flows rates of blowing operations, the increase of the upper limit of the flow rate of the inflowing $H_2$ is kept at a slight effect. Further, the area near the "UPPER LIMIT VALUE OF RATIO OF FLOW RATES OF BLOWING OPERATIONS WITH REFORMED COG ALONE" is less than the "LOWER LIMIT VALUE OF RATIO OF FLOW RATES OF BLOWING OPERATIONS PREFERABLE IN BLAST FURNACE OPERATIONS" shown in FIG. 2 and is not a suitable range of operating conditions. In this way, near the "UPPER LIMIT VALUE OF RATIO OF FLOW RATES OF BLOWING OPERATIONS WITH REFORMED COG ALONE", a concentration of inflowing $H_2$ of a high concentration of $H_2$ (value far exceeding critical upper limit value of concentration of inflowing $H_2$ (35%)) is possible, but operation in this region is not preferable. On the other hand, as explained above, if a concentration of inflowing $H_2$ of not more than the 35% of the critical upper limit value of concentration of inflowing $H_2$, this can be applied without impeding the blast furnace operation in the above "RANGE OF RATIO OF FLOW RATES OF BLOWING OPERATIONS SUITABLE IN BLAST FURNACE OPERATION". When making the critical upper limit value of the concentration of inflowing $H_2$ (35%) the concentration of inflowing $H_2$ ("TIME OF 35% CONCENTRATION OF INFLOWING $H_2$" in figure), the flow rate of inflowing $H_2$ in the majority of the region of the "RANGE OF RATIO OF FLOW RATES OF BLOWING OPERATIONS SUITABLE IN BLAST FURNACE OPERATION" in the figure matches the flow rate of inflowing $H_2$ at the "TIME OF UPPER LIMIT OF CONCENTRATION OF INFLOWING $H_2$" in the figure and becomes the maximum flow rate of inflowing $H_2$. A flow rate of inflowing $H_2$ greater than that of the prior art can be realized. For example, in the case of a concentration of inflowing $H_2$ of 35% and a ratio of flow rates of blowing operations of 1.0, a flow rate of inflowing $H_2$ of 2 times or more the prior art is possible. In a region where the ratio of flow rates of blowing operations falls greatly below 0.5, the flow rate of inflowing $H_2$ at a concentration of inflowing $H_2$ of 35% becomes a smaller value than that of the prior art, but operation under the condition of such a small ratio of flow rates of blowing operations is not preferable in blast furnace operation, so basically this cannot be employed. Therefore, as the upper limit value of the concentration of inflowing $H_2$, about 35% is preferable.

A concentration of inflowing $H_2$ of less than 35% can also be employed, but to make the flow rate of inflowing $H_2$ increase, the concentration of inflowing $H_2$ has to be one where the flow rate of inflowing $H_2$ can become larger than the past. From FIG. 3, when the concentration of inflowing $H_2$ is 15%, a flow rate of inflowing $H_2$ equal to the upper limit value of the flow rate of inflowing $H_2$ in the prior art at the upper limit value (1.0) of the ratio of flow rates of blowing operations can be realized. For this reason, if a concentration of inflowing $H_2$ less than 15%, a flow rate of inflowing $H_2$ exceeding the upper limit value of the prior art cannot be realized, so this is not suitable. Therefore, as the lower limit value of the concentration of inflowing $H_2$, 15% is preferable.

Figure 3:
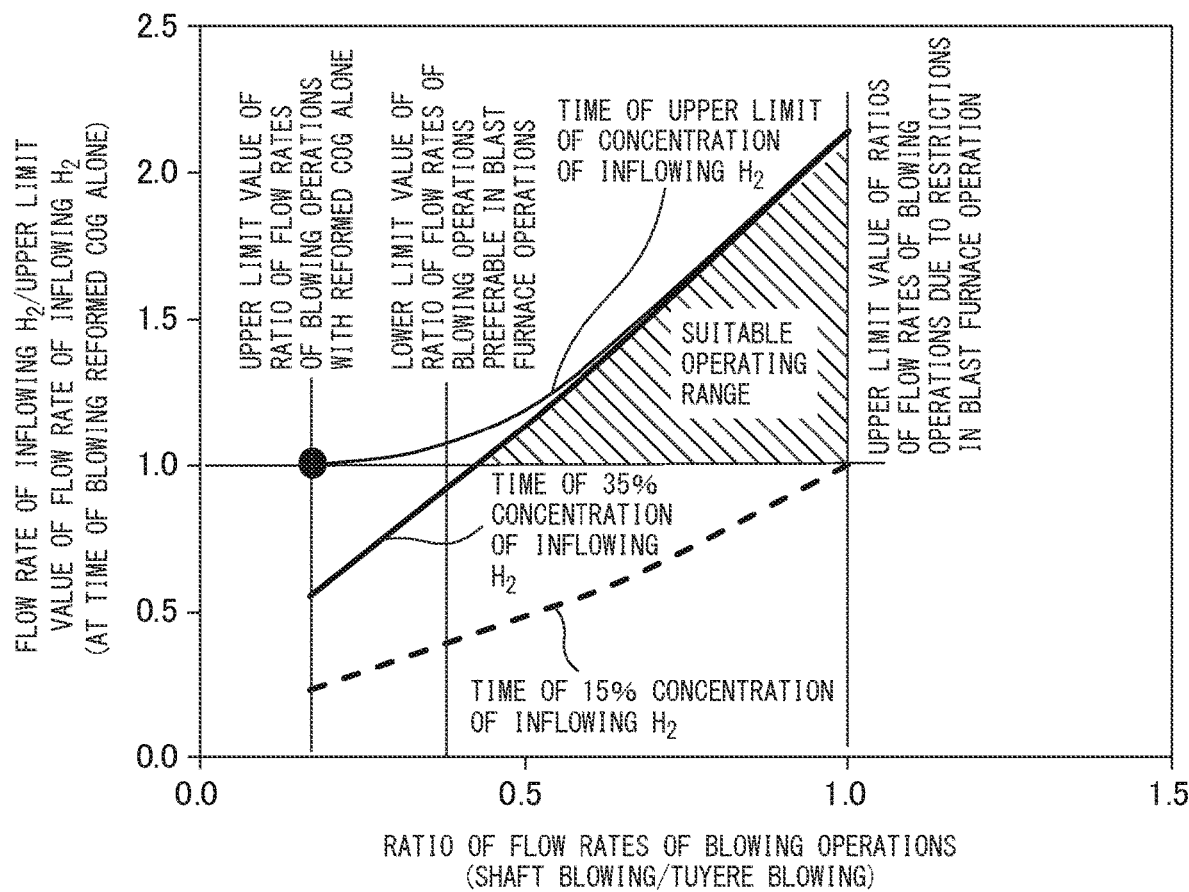
FIG. 3 is a view for explaining the restrictive conditions on the concentration of $H_2$ flowing into the shaft part of a blast furnace.

If considering the object of the present invention of obtaining a flow rate of inflowing $H_2$ above the upper limit value of the flow rate of inflowing $H_2$ in the prior art in addition to the above restrictive condition on the concentration of inflowing $H_2$, as a more preferable operating condition, the "SUITABLE OPERATING RANGE" shown by the hatching in FIG. 3 can be set. The upper limit value of the concentration of inflowing $H_2$ satisfying this "SUITABLE OPERATING RANGE", as explained above, is the upper limit value of the concentration of inflowing $H_2$ or a value close to this, that is, 35%.

This "SUITABLE OPERATING RANGE" corresponds to the range where the concentration of $H_2$ which can be blown into the shaft part can be made to increase. It is learned that to realize this range, the ratio of the flow rate of shaft blowing/flow rate of tuyere blowing has to be made at least the value at the cross point of the line of the flow rate of inflowing $H_2$/upper limit value of flow rate of inflowing $H_2$=1.0 and the curve of a concentration of inflowing $H_2$ of 35% in FIG. 3. The ratio of the flow rate of shaft blowing/flow rate of tuyere blowing at this cross point is about 0.42. That is, the present invention able to supply $H_2$ in a larger amount to deeper in the blast furnace can be realized under this condition of the ratio of the flow rate of shaft blowing/flow rate of tuyere blowing.

Further, the lower limit value of the concentration of inflowing $H_2$ satisfying the "SUITABLE OPERATING RANGE" can be expressed by the following formula:

[Lower limit value of concentration of inflowing $H_2$]=[Upper limit value of flow rate of inflowing $H_2$ in prior art(blowing only COG into shaft)]/[Flow rate of inflowing gas]

Further, increasing the ratio of flow rates of blowing operations also has the effect of improving the spatial uniformity of the $H_2$ reduction reaction in the blast furnace such as shown in FIG. 2, so from the viewpoint of stress on such reaction uniformity, it is also possible to employ operating conditions resulting in a somewhat lower flow rate of inflowing $H_2$ than the upper limit value of flow rate of inflowing $H_2$ in the prior art so long as within the "RANGE OF RATIO OF FLOW RATES OF BLOWING OPERATIONS SUITABLE IN BLAST FURNACE OPERATION".

Further, in the present invention, gas obtained by diluting by the blast furnace gas the low CO concentration and high $H_2$ concentration gas manufactured from the coke oven gas is used as the reducing gas, so the inflowing gas unavoidably contains steam. The steam in the reducing gas acts to reduce the concentration of $H_2$ and acts to enable the reducing gas to reach a deeper part of the blast furnace. Regarding this, it has a similar effect as the blast furnace gas for dilution use in the present invention, so the concentration of inflowing $H_2$ should be defined by the wet % including steam.

Next, the reducing gas for supply to the shaft part will be explained. As explained previously, the reducing gas for supply to the shaft part has to have a hydrogen concentration of 15 to 35 vol % (wet). The reducing gas should be supplied to the shaft part at 800 to 1000° C. in temperature so that the operation of the blast furnace is not impeded further.

As the reducing gas satisfying such a condition, it is not possible to directly utilize the coke oven gas or blast furnace gas usually emitted in an ironmaking plant. Therefore, in the present invention, low CO concentration and $H_2$ concentration gas manufactured from coke oven gas is diluted by blast furnace gas to adjust the hydrogen concentration for use of the gas.

For example, the reducing gas used in the present invention can be prepared by reforming coke oven gas by heat treatment and mixing with the reformed gas enriched in hydrogen gas one of the gases selected from (i) a gas containing CO, (ii) combustion gas obtained by combustion of flammable gas and oxygen, and (iii) oxygen.

First, an embodiment reforming coke oven gas by heat treatment and mixing with the reformed gas enriched in hydrogen gas a flammable gas containing CO and oxygen will be explained with reference to FIG. 4. In this embodiment, as the reforming by heat treatment, partial oxidation is utilized.

Raw Material Coke Oven Gas (COG)

In the present invention, reformed COG obtained by heat decomposition of coke oven gas (COG) emitted in a coke oven, that is, crude COG, in a carbonization furnace to increase the hydrogen and otherwise adjust the constituents is most preferably used as the raw material COG from the viewpoint of reducing $CO_2$ emission. Alternatively, refined COG obtained by refining the crude COG emitted in a coke oven and generally used as fuel in an ironmaking plant may be used as the raw material COG. The raw material COG gas may be supplied from the COG supply source 1 shown in FIG. 4. As the COG supply source 1, a COG gas holder etc. can be used.

The crude COG emitted at the time of coal dry distillation at the coke oven (not shown) contains methane, ethane, and other aliphatic organic gases, benzene, toluene, and other aromatic hydrocarbon light oil gases, tar gas mainly comprised of aromatic heavy hydrocarbons, etc. Further, the moisture deposited on or contained in the coal used evaporates inside the coke oven so the COG generally contains steam.

In an embodiment using refined COG obtained by treating the crude COG in a carbonization furnace, as the main substance decomposed by heat in the hydrogen generation reaction in the carbonization furnace, tar is suitable. This is because when decomposing by heat the aromatic hydrocarbons of the main ingredient of tar, the remaining hydrocarbons after the release of hydrogen easily grow into macromolecules comprised of two-dimensional aromatic polycyclic structures whereby solid carbon granules of diameters of several µm to several mm are easily obtained and whereby solid carbon is easily held in the carbonization furnace. By holding the produced solid carbon in the carbonization furnace for a certain time period, the hydrogen which remained in the solid carbon also gradually disassociates as hydrogen gas, so the heat decomposition is promoted much more. On the other hand, aliphatic organic substances can also be decomposed by heat, but the solid carbon generated at that time generally often becomes an amorphous state structure with diamond-like crystal structures scattered at random. The solid carbon is generated as ultrafine particles with diameters of the nanometer to submicron size. Therefore, it tends to be difficult to hold the generated solid carbon in the carbonization furnace or separate and discharge it all together from the carbonization furnace. Further, in the case of COG unavoidably containing a high concentration of hydrogen sulfide gas, in the hydrogen generation reaction using a catalyst, the reaction of the tar generally proceeds at a faster reaction speed than the reaction of the aliphatic hydrocarbons. On this point as well, heat decomposition of tar is advantageous.

Raising COG in Pressure

According to the present invention, the blast furnace 10 with the shaft part to which the reducing gas is supplied is usually operated at a pressure of several thousand kPa to 1 MPa, so to supply gas from the shaft part 11 of the blast furnace to the inside of the blast furnace 10, the ordinary pressure COG at the gas holder 1 has to be raised in pressure to at least the inside pressure at the shaft part of the blast furnace. This rise in pressure may be performed using a compressor 2. For the compressor 2, a commercially available one can be applied. For example, a multistage axial flow compressor or centrifugal type compressor can be used. A compressor operating at the temperature of the supply of gas at the shaft part of the blast furnace (about 900° C.) is not generally available, so the COG can also be compressed at an ordinary temperature part.

Adjustment of Flow Rate of COG

The flow rate of the hydrogen gas supplied to the shaft part 11 of a blast furnace is adjusted to match with the operating state of the blast furnace 10 by adjusting the flow rate of the raw material COG. The flow rate of the COG can be adjusted by a flow rate adjustment apparatus 3 suitably configured by combining a commercially available flowmeter, flow rate regulator, computer, and other control devices. A high temperature specification flow rate regulator is not generally available, so COG can also be adjusted in the flow rate at an ordinary temperature part. In the embodiment of FIG. 4, the flow rate is adjusted after raising the pressure, but the order of this may be suitably changed.

Partial Oxidation Reforming Reaction of COG

The raw material COG is mixed with oxygen gas in the partial oxidation reforming reactor 5 and part of the COG is made to burn (partial oxidation) to raise the COG to a temperature of over 1200° C. and thereby raise the reaction speed. The methane and other hydrocarbons in the COG are decomposed and reformed without using a catalyst so as to manufacture hydrogen gas. As explained later, in the present invention, it is not necessary to break down all of the hydrocarbons in the raw material COG, so the gas temperature may be allowed to fall due to the absorption of heat due to the steam reforming reaction occurring after the partial oxidation and become less than the steam reforming reaction temperature before all of the hydrocarbons decompose. If raising the temperature to a sufficiently high temperature over 1200° C. at the time of partial oxidation, the subsequent steam reforming reaction will enable the majority of the hydrocarbons, though not all, to be decomposed, so there is no problem.

The oxygen gas is preferably supplied in the form of pure oxygen from the viewpoint of the quality of the hydrogen gas manufactured. Oxygen-enriched air or other oxygen-containing gas can also be supplied as the oxygen gas. The flow rate of supply of the oxygen gas (molar flow rate) is preferably 0.4 to less than 0.5 of the total value of the molar flow rate of carbon atoms contained in the hydrocarbons (methane etc.) in the COG (that is, $O_2/C=0.4$ to less than 0.5) from the viewpoint of the quality of the gas. If the $O_2/C$ ratio is less than 0.4, hydrogen is not sufficiently enriched at the time of the partial oxidation, so it is not possible to sufficiently manufacture the hydrogen gas required for hydrogen smelting in the blast furnace and the hydrocarbon decomposition rate becomes excessively low and the restrictions on the constituents of the reducing gas supplied to the shaft part of the blast furnace are not satisfied. Further, if the $O_2/C$ ratio is 0.5 or more, with a partial oxidation operation predicated on a nonequilibrium reaction like in the present invention, a large amount of steam generated due to combustion of the hydrogen remains in the gas after the partial oxidation, so this is not preferable.

Preheating of COG

In the present invention, the flow rate of $O_2$ supplied at the time of partial oxidation is made the minimum extent by preheating the raw material COG. For the preheating apparatus 4 for this, various types of commercially available heat exchangers can be used. As the preheating method, the outside heat system not causing contamination of the raw material COG is preferable. The temperature of the raw material COG after preheating is preferably made 800° C. to 1000° C. If the preheating temperature is less than 500° C., the peak temperature of the gas temperature at the time of partial oxidation becomes lower than the reforming reaction temperature during reforming of the hydrocarbons and there is the problem that the hydrocarbons cannot be sufficiently decomposed. Preheating up to a temperature of over 1000° C. is not a problem from the viewpoint of the reactivity, but a high temperature unnecessary for decomposition of hydrocarbons is reached at the time of partial oxidation, so the energy required for the excessive preheating becomes wasted, so this is not preferable from the viewpoint of reducing $CO_2$ emission. Further, preheating up to a high temperature such as one over 1000° C. requires a special heating apparatus, so this is not preferable from the viewpoint of capital costs.

Operating Conditions of Partial Oxidation Step

Stoichiometrically, the $O_2/C$ ratio in the partial oxidation of the raw material COG can become optimal when 0.5. This is because all of the $H_2O$ emitted by formula 4 due to the supply of oxygen gas is consumed by the steam reforming reaction of formula 1 and because all of the hydrocarbons are broken down into CO and $H_2$ due to the steam reforming reaction. However, to cause such a reaction under the pressure conditions of the reducing gas supplied to the shaft part of a blast furnace, in terms of equilibrium theory, a 1300° C. or more temperature has to be maintained during the steam reforming occurring after the partial oxidation. In the case of a temperature lower than this, for example an order of several % of hydrocarbons and a large amount of $H_2O$ derived from the excess $O_2$ remain in the gas after partial oxidation. For achieving such a high temperature by just partial oxidation, a large amount of $O_2$ has to be supplied. It is also possible to cut the amount of supply of $O_2$ by preheating the raw material gas, but in the past, the exhaust heat generated in the plant was used for this preheating, so at the highest, only preheating up to about 500° C. was performed. This is because preheating up to a temperature higher than this becomes disadvantageous in terms of heat efficiency. For this reason, in conventional partial oxidation of hydrocarbons, the complete decomposition of the hydrocarbons was aimed at and the $O_2/C$ ratio, in the case of using natural gas or naphtha or other pure hydrocarbon as a raw material, was 0.6 to 0.7 or so (if the hydrocarbon is methane, the supplied $O_2$ volume flow rate is 0.6 to 0.7 time the raw material volume flow rate) and, in the case of using purified COG with a concentration of hydrocarbons of 30% or so as a raw material, was 0.8 or more (if the hydrocarbon is methane, the supplied $O_2$ volume flow rate is 0.24 time or more the raw material volume flow rate). If using such a high $O_2/C$ ratio, if possible to maintain a high temperature at the time of steam reforming, the residual amount of $CO_2$ becomes a level of several % to 10 odd %, while if not possible to maintain a sufficiently high temperature at the time of steam reforming, 10% or more steam remains, so in each case, the already explained restrictive conditions relating to the constituents of the reducing gas supplied to the shaft part of a blast furnace cannot be satisfied. In the present invention, reformed COG having a concentration of hydrocarbons further smaller than refined COG (20% or so or less) is used as the raw material, so the amount of oxygen supplied per flow rate of the raw material gas is smaller than the case of using such gases as the raw material (if the hydrocarbon is methane and the $O_2/C$ ratio is made 0.8, the supplied $O_2$ volume flow rate is 0.16 time or less of the raw material volume flow rate) and the amount of temperature rise due to partial oxidation is also very small, so this is more disadvantageous in the point of maintaining the temperature required for the steam reforming reaction.

In the present invention, the concentration of hydrocarbons in the reducing gas is made to become the already explained restricted range by mixing it with CO-containing gas to dilute the residual hydrocarbons. In the present invention, complete decomposition of hydrocarbons is not aimed at, so the $O_2/C$ may also be less than 0.5. The supplied $O_2$ may be further reduced (if the $O_2/C$ ratio is 0.4 and the hydrocarbons are methane, the supplied $O_2$ volume flow rate is 0.08 time or less the raw material volume flow rate), and the $CO_2$ and $H_2O$ in the reducing gas can be made the already explained restricted ranges. Furthermore, in the present invention, to secure the temperature required for steam reforming after partial oxidation for a certain time, as the method of making up for the deficient amount of temperature rise, preheating at 800° C. to 1000° C. is jointly used. Such high temperature preheating in the partial oxidation process is a cause of deterioration of the heat efficiency compared with the prior art if viewing the partial oxidation step alone, so in the past, such high temperature preheating had been considered difficult economically. However, after partial oxidation, it is possible to directly supply the reducing gas diluted by the CO-containing gas to the shaft part of a blast furnace, so if considering the fact that the supply of heat energy for reheating the reducing gas after cooling it once so as to adjust the constituents after partial oxidation in the prior art is unnecessary in the present invention etc., in the present invention, it is possible to slash the overall energy consumption, so in the present invention, preheating at such a high temperature is possible. In this way, by preheating the raw material to 800° C. to 1000° C., using reformed COG as the raw material, performing partial oxidation combined with supply of oxygen making $O_2/C$ 0.4 to less than 0.5, and diluting the gas after partial oxidation by CO-containing gas in a joint manner, in the present invention, it is possible to manufacture reducing gas suitable as the reducing gas for supply to the shaft part of the blast furnace under conditions of reduced $CO_2$ emission.

A burner or other igniting means (not shown) may also be provided inside of the partial oxidation reforming reactor 5 or upstream of the partial oxidation reforming reactor 5. If the inside walls of the partial oxidation reforming reactor are held at a temperature sufficiently higher than the ignition point of the raw material COG, the partial oxidation reaction can be stably continued inside the partial oxidation reforming reactor without relying on the temperature of supply of the raw material COG or the supplied oxygen gas.

The gas temperature after raising the temperature by combustion in the reactor 5 is preferably made 1200° C. to 1800° C. in range. If less than 1200° C. gas temperature, the chemical reaction speed is excessively slow, so if trying to proceed with the reforming operation at this range of temperature, the problem arises of the dimensions of the reactor becoming gigantic. If the highest temperature of the gas exceeds 1800° C., there is the problem that the temperature of the inside walls of the reactor which contact the gas becomes too high and the lifetime of the furnace members is remarkably shortened. Due to the absorption of heat at the time of the steam reforming reaction occurring after the partial oxidation, the gas temperature will fall at the downstream side of the partial oxidation furnace and may become one of the above temperature or less, but if the peak temperature of the gas after partial oxidation is in the above range, there is no problem since the majority of the hydrocarbons in the raw material COG can be decomposed.

The volume of the reactor 5 is preferably one by which the apparent average residence time of the gas ([Reactor volume]/([Flow rate of treated COG (standard state)]+[Flow rate of oxygen supplied from outside (standard state)])) becomes 5 seconds to 120 seconds. If less than this range, the reactor residence time of the treated gas is excessively small and the problem arises of the reforming reaction of the methane not sufficiently proceeding. Further, if over this range, the reactor residence time is excessively large and the problem arises of excessive capital costs being required.

At the downstream side in the partial oxidation reforming reactor after the elapse of a predetermined apparent average residence time, the gas can be considered to have been sufficiently reformed, so gas at the downstream side of this will be called "reformed gas".

Supply of CO-Containing Gas

Next, CO-containing gas is supplied to the reformed gas in the partial oxidation reforming reactor to dilute the reformed gas and reduce in particular the concentration of hydrogen gas in the reformed gas to a suitable range. By supplying such a gas in a greater amount to the shaft part of a blast furnace, it is possible to supply the larger amount of hydrogen gas contained in the reformed gas to a deeper position inside the blast furnace (location of blast furnace closer to center axis in radial direction).

The supply of CO-containing gas to the reformed gas in the partial oxidation reforming reactor also acts to cause heat exchange (mixture) between the high temperature reformed gas and low temperature CO-containing gas to thereby obtain a temperature range suitable for the reducing gas to be supplied to the shaft part of a blast furnace. Further, due to this, preheating of the CO-containing gas to be supplied to the partial oxidation reforming reactor becomes unnecessary or can be greatly reduced in extent. Further, the reformed gas finishes being cooled inside the partial oxidation reforming reactor which inherently has heat resistance, so due to this, in the downstream equipment, there is no longer a need for extreme heat resistance specifications (for example: 1200° C. or more), the lifetime of the equipment can be extended, and the apparatus also becomes inexpensive.

The CO-containing gas is supplied from a supply port provided at a location where gas passes after the elapse of the above predetermined residence time inside the partial oxidation reforming reactor 5 to the inside of the partial oxidation reforming reactor 5. This supply port must be provided downstream from the location of supply of oxygen gas to the partial oxidation reforming reactor 5.

The CO-containing gas is supplied by a CO-containing gas supplying means 9 comprised of a CO-containing gas supply source 7, a CO-containing gas flow rate adjusting means 8, and a CO-containing gas supply port to the partial oxidation reforming reactor 5 connected to the gas pipe in that order.

CO-Containing Gas

The necessary conditions of the CO-containing gas supplied to the reducing gas obtained at the partial oxidation reforming reactor 5 are as follows:

It be mainly comprised of CO so as to secure the reducibility of the gas after dilution of COG.

It be dry gas not containing tar or other hydrocarbons or steam impeding the operation of the blast furnace.

It as much as possible not contain $H_2$ or $CO_2$ which might cause an endothermic reaction from the viewpoint of securing the temperature at the shaft part of the blast furnace.

It have a sufficiently small $N_2$ content so as to avoid energy loss due to running useless gas through the inside of the blast furnace.

There is no existing inexpensive gas which satisfies all of these conditions, so the desired gas is manufactured based on a specific raw material. As the raw material, for example, blast furnace gas, converter gas, synthesis gas, etc. can be used. These gases all contain $CO_2$. From the above-mentioned restriction 2 of the constituents of the reducing gas, the smaller the concentration of this $CO_2$, the greater the reduced $CO_2$ emission, so when manufacturing the CO-containing gas, means for removing $CO_2$ are applied. As the means for removing $CO_2$, for example, a commercially available physical adsorption method CO separation apparatus or $CO_2$ separation apparatus can be used. The CO-containing gas to which the means for removing $CO_2$ has been applied should not contain 1 vol % (dry) or more of $CO_2$ so as to keep the detrimental effect of heat absorption due to the $CO_2$ decomposition reaction which can occur in a blast furnace from being manifested. That is, the concentration of $CO_2$ of the CO-containing gas supplied to the partial oxidation reactor is preferably 0 vol % (dry) to less than 1 vol % (dry). In the case of using synthesis gas or other gas containing $H_2$ as the raw material, the concentration of $H_2$ in the CO-containing gas for mixture with the gas after partial oxidation, which generally has a concentration of $H_2$ higher than the upper limit value 35% of the preferable concentration of $H_2$ in the reducing gas explained above, so as to obtain 35% or less of a reducing gas has to be at least less than 35%. To use gas containing excessive $H_2$ as CO-containing gas, it is possible to use means for removing $H_2$ to reduce the concentration of $H_2$. As the means for removing $H_2$, it is possible to use a commercially available membrane separation apparatus etc. The $N_2$ concentration is also preferably at least less than 20 vol % from the viewpoint of the above-mentioned restrictions on the constituents of the reducing gas. For this reason, this can be realized by reducing the amount of use and amount of mixture of air (that is, the $N_2$ source) at the time of manufacture of the CO-containing gas. However, to lower the amount of use and amount of mixture of air at the time of manufacturing the CO-containing gas to the extremely low concentration of less than 1%, a large amount of additional energy has to be supplied, so this is not preferable from the viewpoint of reduced $CO_2$ emissions. For this reason, the $N_2$ concentration is preferably 1 vol % or more.

Supply of Manufactured Hydrogen-Containing Reducing Gas to Shaft Part of Blast Furnace The hydrogen gas-containing reducing gas adjusted by supply of CO-containing gas to a temperature suitable for hydrogen gas for supply to the shaft part of a blast furnace is supplied to the shaft part 11 of the blast furnace (part around blast furnace shaft where plurality of through holes are provided from which hydrogen gas is supplied). For the structure and materials of the shaft part of a blast furnace, ones of the prior art can be applied.

Water Content Reducing Means of COG

Figure 5:
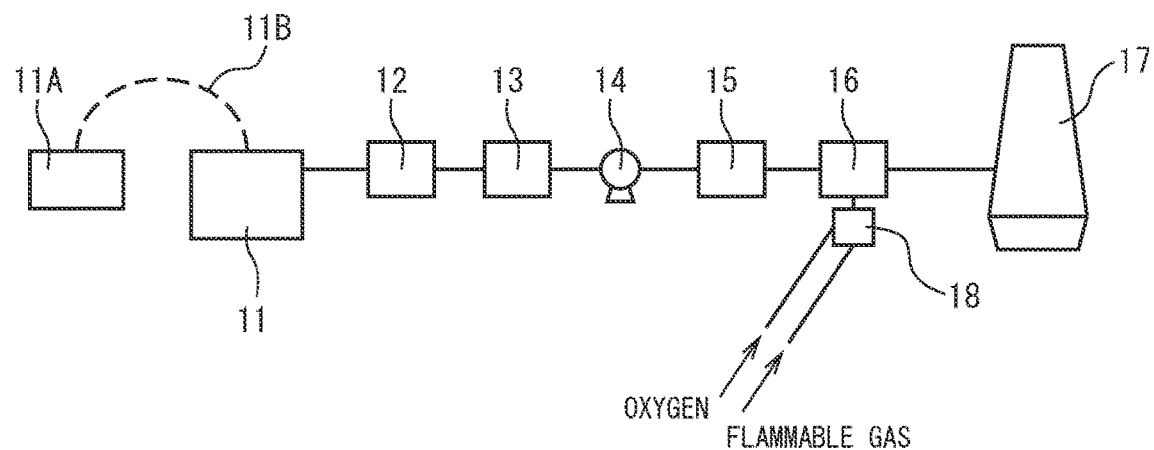
FIG. 5 is a schematic view explaining a second embodiment of manufacture of reducing gas used in the present invention.

The coal supplied to the coke oven may be made to dry in advance using a known DAPS or SCOPE21 furnace. If dry distilling the thus dried coal, it is possible to make the moisture in the COG emitted decrease. Alternatively, in the case of a smaller system, it is also possible to store the coal in a stock house for a long period of time of several months or more and allow the moisture to naturally evaporate during that time. FIG. 5 shows a coke oven 11 to which a means 11A for reducing the moisture of the emitted coke oven gas (COG) is attached. For example, a DAPS, SCOPE 21, etc.

for reducing the moisture of coal may be made the moisture reducing means 11A and the coal dehydrated by the moisture reducing means 11A may be transported by a belt conveyor or other coal conveying means 11B to the coke oven 11.

In some cases, it is also possible to supply the moisture of the coal to the coke oven without decreasing it, extract the COG containing a high concentration of steam generated in the coke oven, and run it through high temperature use zeolite or other adsorbent to thereby decrease the moisture in the COG.

Carbonization Furnace

In the present invention, if using the reformed coke oven gas (refined COG) obtained by treating the crude coke oven gas from the coke oven 11 (FIG. 5) in the carbonization furnace as the raw material gas, the carbonization furnace 12 (FIG. 5) is a furnace for reforming the hydrocarbons (mainly tar gas) in the COG continuously supplied from the coke oven 11, separating the hydrogen gas and solid carbon, and discharging reformed gas enriched in hydrogen gas to the downstream side. The temperature inside the furnace is held at a temperature suitable for a heat decomposition reaction and the heat of reaction required for the hydrogen generation reaction, mostly comprised of heat decomposition, is supplied by providing the carbonization furnace with a heat supplying means (not shown) for supplying heat from outside the furnace body (or by providing the furnace with a heating element etc. for supplying heat from inside the furnace). To supply this heat, general heating by an electric heater or direct flame heating can be used. The carbonization furnace 12, to avoid combustion at that location of the solid carbon produced, has a structure avoiding as much as possible the inflow of the source of oxidation of oxygen, air, steam, etc. to the carbonization furnace. Specifically, no means for supplying oxygen to the COG in the hydrogen generation reaction such as in a partial oxidation method is provided. Steam also is not added to the COG other than what was originally contained in the COG. The reaction temperature suitable for the heat decomposition reaction of tar is generally 650° C. to 900° C. in range in the case of using a pyrolysis catalyst. If less than this temperature range, if running the COG through the carbonization furnace, the tar will condense and this condensate will close the spaces between solid carbon particulates, so there is the problem that the carbonization furnace will easily clog. Further, the pressure inside the carbonization furnace is preferably lower than the pressure inside the coke oven. For example, the pressure inside the coke oven is usually over 10 Pa (gauge pressure), so the pressure inside the carbonization furnace may be made 10 Pa (gauge pressure) or less to maintain the passage of the COG. There is no particular lower limit of the pressure inside the carbonization furnace, but from the viewpoints of the pressure resistance of the carbonization furnace, the gas density inside the carbonization furnace, the necessary vacuum apparatus capability (this sometimes becomes necessary), etc., it may be made −20000 Pa (gauge pressure) or more.

Catalyst

Inside of the carbonization furnace 12, a pyrolysis catalyst (not shown) can be placed. For the pyrolysis catalyst, for example, a catalyst comprised of a composite oxide containing nickel, magnesium, cerium, and aluminum but not containing alumina, in which catalyst the composite oxide uses a catalyst comprised of NiMgO, $MgAl_2O_4$, and $CeO_2$ crystal phases can be used.

Gas Refining Apparatus

In the primary reformed gas extracted from the carbonization furnace 12, at least the tar, light oil, benzene and other high boiling point hydrocarbons or moisture and other condensable gases can be removed by a gas refining apparatus 13. The condensable gas can be removed by using a water cooling apparatus of gas using a scrubber etc. or by using a distillation tower. If necessary, treatment for removing sulfur or treatment for removing ammonia may also be added. The high temperature primary reformed gas from the carbonization furnace 12 is cooled by treatment at the gas refining apparatus 13 at least down to a temperature lower than the heat resistance temperature of the gas conveyor apparatus 14, usually down to close to ordinary temperature.

Gas Conveyor Apparatus

The gas conveyor apparatus 14 is an apparatus for taking in primary reformed gas from the carbonization furnace 12 and for raising it in pressure and sending it to the partial oxidation reforming apparatus 16 (explained later). For this reason, the gas conveyor apparatus 14 requires a head enabling the entrance side pressure to be maintained at −10 kPa or so and the exit side pressure to be maintained at least at 0.2 MPa, generally 0.2 to 1 MPa or so. For the gas conveyor apparatus 14, it is possible to use a commercially available multistage axial flow compressor etc.

Preheating Apparatus

The primary reformed gas raised in pressure at the gas conveyor apparatus 14 is subsequently sent to the reforming apparatus 16 for further reforming by partial oxidation. In this reforming apparatus 16, gas combustion using oxygen gas is utilized to raise the temperature of the running gas, but from the viewpoint of reducing the amount of $CO_2$ generated and from the prime units of hydrogen, the amount of oxygen supplied should be set to the minimum necessary limit. However, if raising the temperature of the ordinary temperature primary reformed gas by gas combustion, the temperature of the running gas after being raised in temperature will often not rise to an extent enabling promotion of decomposition of methane by steam reforming. For this reason, it is possible to preheat the primary reformed gas from the carbonization furnace 12 by the preheating apparatus 15, then raise the temperature of the running gas by gas combustion to make the temperature of the running gas after being raised in temperature a suitable range. The preheating temperature of the primary reformed gas is preferably 300 to 800° C. or so.

The primary reformed gas can be preheated in the preheating apparatus 15 by, for example, using a commercially available heat exchanger or by causing heat exchange with combustion gas generated in a separately provided combustion furnace.

Next, an embodiment in which coke oven gas is reformed by heat treatment and in which the reformed gas enriched in hydrogen gas is mixed with a combustion gas obtained by burning a flammable gas and oxygen will be explained with reference to FIG. 5. In this embodiment, reforming using heat decomposition in a carbonization furnace explained previously as reforming by heat treatment (primary reforming) and further reforming in a partial oxidation reforming apparatus (secondary reforming) are utilized. Other than the parts of the apparatus and method explained below, it is possible to use an apparatus and method similar to the first embodiment.

Partial Oxidation Reforming Apparatus

The partial oxidation reforming apparatus 16 is an apparatus which mixes combustion gas with the primary reformed gas to raise the temperature of the primary reformed gas to a temperature greatly exceeding 1000° C. (for example, 1500° C.) and thereby increase the reaction speed and break down the methane and other hydrocarbons in the primary reformed gas without the use of a catalyst and thus emit hydrogen gas or CO gas. As the partial oxidation reforming apparatus 16, any one can be used so long as satisfying these requirements.

The reforming apparatus 16 has a burner 18 connected to it. The burner 18 is supplied with oxygen gas and flammable gas. These are mixed and made to ignite inside the burner and the combustion gas is exhausted to the inside of the reforming apparatus 16. As the burner 18, a commercially available axial flow burner etc. can be used.

The oxygen gas is preferably supplied in the form of pure oxygen from the viewpoint of the quality of the secondary reformed gas, but air or oxygen-enriched air or other oxygen-containing gas can also be supplied as the oxygen gas.

The flow rate of supply of oxygen gas (molar flow rate) is preferably 0.4 time to less than 0.5 time the total value of the molar flow rates of carbon atoms contained in the hydrocarbons in the primary reformed gas and the hydrocarbons in the flammable gas (that is, corresponding to $O_2/C=0.4$ to less than 0.5) from the viewpoint of the quality of the secondary reformed gas.

On the other hand, the flow rate of flammable gas supplied to the burner 18 (molar flow rate) is preferably 0.2 to 1 time the flow rate of oxygen gas (molar flow rate).

For the flammable gas, natural gas, liquefied petroleum gas, etc. can be used. Further, naphtha, light oil, heavy oil, and other liquid fuels can also be used if atomized for supply to the inside of the burner since they are fundamentally no different from flammable gas.

Among these flammable gases, use of natural gas mainly comprised of methane is particularly advantageous. Natural gas is advantageous in that the price per amount of heat generated is inexpensive, the amount of $CO_2$ generated per amount of heat generated is relatively small, the gas does not (like COG) contain hydrogen gas, so hydrogen is not consumed at the time of combustion, etc.

Oxygen gas and flammable gas may be supplied to the burner 18 at ordinary temperature or may be supplied after preheating. If supplying them at less than the ignition temperature of the flammable gas, it is necessary to provide an igniting means (not shown) at the burner 18. For example, it is possible to provide a pilot burner (not shown) at the burner 16 to make the mixed gas of the flammable gas and oxygen gas ignite.

The gas temperature inside the reforming apparatus 16 has to be maintained at least at 1000° C. or more. The maximum temperature is preferably 1200 to 1800° C. in range. This is because if less than this temperature range, the chemical reaction speed becomes excessively slow, so the problem arises of the dimensions of the reforming apparatus 6 used as a reactor becoming gigantic and because if over this temperature range, there is the problem that the temperature of the inside walls of the reforming apparatus contacting the gas becomes too high and the lifetime of the material forming the inside walls is remarkably shortened.

A thermometer (not shown) may be provided inside the partial oxidation reforming apparatus 16 to measure the temperature of the gas inside the apparatus and this measured value may be used as the basis to control the temperature of the gas inside the apparatus. For the thermometer, an R-type or B-type thermocouple covered by ceramic or another heat resistant material for protection may be used.

The volume of the reforming apparatus 16 used as the reactor is preferably one whereby the apparent average residence time of the gas ([Volume of reaction vessel]/([Flow rate of treated primary reformed gas (standard state)]+[Flow rate of combustion gas supplied from outside (converted to ordinary pressure and 100° C.)])) becomes 30 seconds to 100 seconds. If less than this range, the residence time of the treatment gas in the reforming apparatus becomes excessively small and the problem arises of the reaction not sufficiently proceeding. Further, if over this range, the residence time in the reforming apparatus becomes excessively large and the problem arises of excessive capital costs being required.

Supply of Manufactured Reducing Gas (Secondary Reformed Gas) to Shaft Part of Blast Furnace The reducing gas (secondary reformed gas) containing hydrogen obtained from the partial oxidation reforming apparatus 16 is supplied to the shaft part 7 of a blast furnace. In some cases, before introduction into the blast furnace, the reducing gas may also be adjusted in temperature. The art of supplying reducing gas to a blast furnace is broadly known. There is no need to explain it in detail here.

Next, an embodiment mixing unburned flammable gas and oxygen with the reformed gas enriched in hydrogen gas by reforming the coke oven gas by heat treatment will be explained with reference to FIG. 6. In this embodiment, flammable gas is directly supplied to the partial oxidation reforming apparatus 16 in advance without being made to burn. Therefore, in this embodiment, the burner 18 explained in FIG. 5 is not used.

In the reforming apparatus 16 of this embodiment, the independent burner is eliminated and the oxygen gas and the flammable gas are closely and directly supplied to the reforming apparatus. In this case, the supplied oxygen gas and flammable gas are in close proximity, so a combustion region is formed near the gas supply port. Here, mainly oxygen gas and flammable gas burn, so this combustion region plays substantially the same role as a burner. In some cases, the oxygen gas and the flammable gas may be supplied to the inside of the reforming apparatus together in advance.

Figure 6:
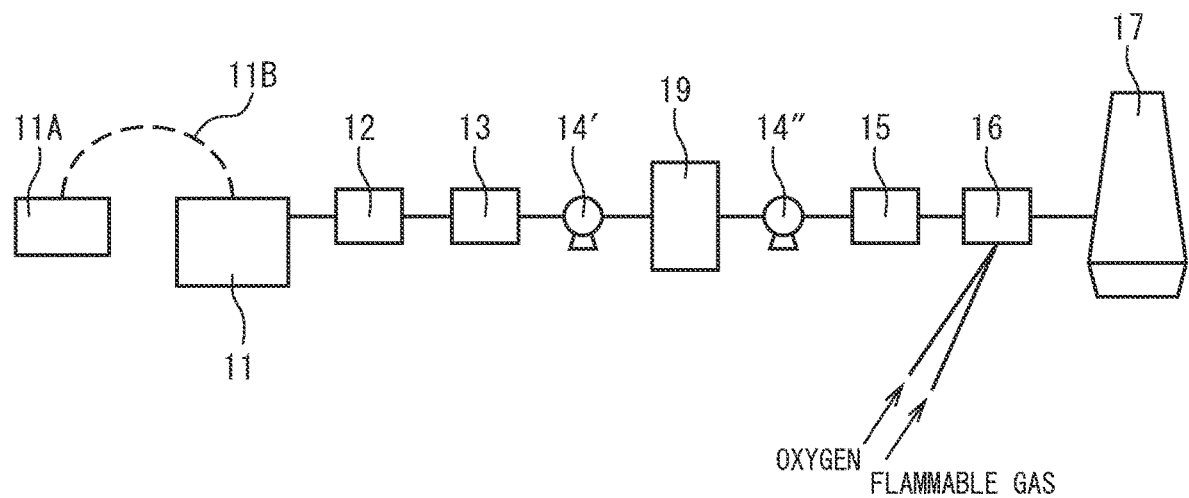
FIG. 6 is a schematic view explaining a third embodiment of manufacture of reducing gas used in the present invention.

Further, in the embodiment shown in FIG. 6, a gas holder 19 is arranged between the gas refining apparatus 13 and the preheating apparatus 15 and a first gas conveyor apparatus 14' and a second gas conveyor apparatus 14" are provided before and after it. The gas holder 19 can temporarily store the primary reformed gas. The operability is improved in that there is no need to completely synchronize the production of the primary reformed gas and the production of the secondary reformed gas. The capacity of the gas holder 19 can be suitably determined based on the operating conditions of the coke oven 11 and the blast furnace 17. The entrance side and exit side of the gas holder 9 are respectively provided with gas conveyor apparatuses 14', 14", so it is possible to select the optimal gas conveyor apparatuses in accordance with the characteristics of the operating conditions of the primary reformed gas production side and the secondary reformed gas production side. For example, the first gas conveyor apparatus 14' does not require pressure boosting, so a Roots blower or other inexpensive apparatus can be applied. For the second conveyor apparatus 14", a commercially available multistage axial flow compressor etc. can be used. Needless to say, a configuration using a gas holder 19 and gas conveyor apparatuses 14', 14" before and after it can also be applied to the embodiment explained previously with reference to FIG. 5.

The other apparatuses and equipment in the embodiment of FIG. 6 are similar to those in the embodiment shown in FIG. 5.

In the embodiment utilizing reforming by heat decomposition in the carbonization furnace explained with reference to FIG. 5 and FIG. 6 (primary reforming) and further reforming at the partial oxidation reforming apparatus (secondary reforming), the primary reformed gas is a single type of flammable gas, so the primary reformed gas can also be used as the flammable gas. In this case, the primary reformed gas does not necessarily have to be supplied by another system to the burner 8 (FIG. 5) or the combustion region of the partial oxidation reforming apparatus 16 (FIG. 6). It is sufficient that oxygen gas alone be directly supplied to the inside of the reforming apparatus. The space near the oxygen supply port inside the reforming apparatus 16 becomes the combustion region. This combustion region plays substantially the same role as a burner.

Note that, the primary reformed gas contains a large amount of hydrogen gas along with methane. The speed of combustion of hydrogen gas is generally faster compared with methane gas, so if oxygen is supplied inside the reforming apparatus 16, the hydrogen in the primary reformed gas is consumed and steam is produced. If this gas is maintained at a high temperature inside the reforming apparatus 16, the generated steam reforms the methane to produce hydrogen, so if a sufficient time period for holding the gas at a high temperature can be set inside the reforming apparatus 16, there is no problem in breaking down the methane in the primary reformed gas. However, if the time period for holding the gas is not sufficient, the secondary reformed gas is exhausted before the steam reforming of the methane sufficiently proceeds, so it becomes impossible to restore the hydrogen gas consumed by combustion. Therefore, if directly supplying oxygen to the inside of the reforming apparatus 16, it is necessary to set the dimensions of the reforming apparatus 6 used as the reaction vessel sufficiently large.

If directly supplying oxygen gas into the primary reformed gas, it would be difficult to separate the amount of the primary reformed gas of the combustion gas from the primary reformed gas as a whole, so the flow rate of supply of flammable gas in this case may be less than 0.2 time the lower limit flow rate of supply of oxygen gas (molar flow rate) in the case of supply as combustion gas to the reforming apparatus through the burner 18.

EXAMPLES

Using the following examples, the present invention will be further explained. This being said, the present invention is not limited to these examples.

Example 1

Figure 4:
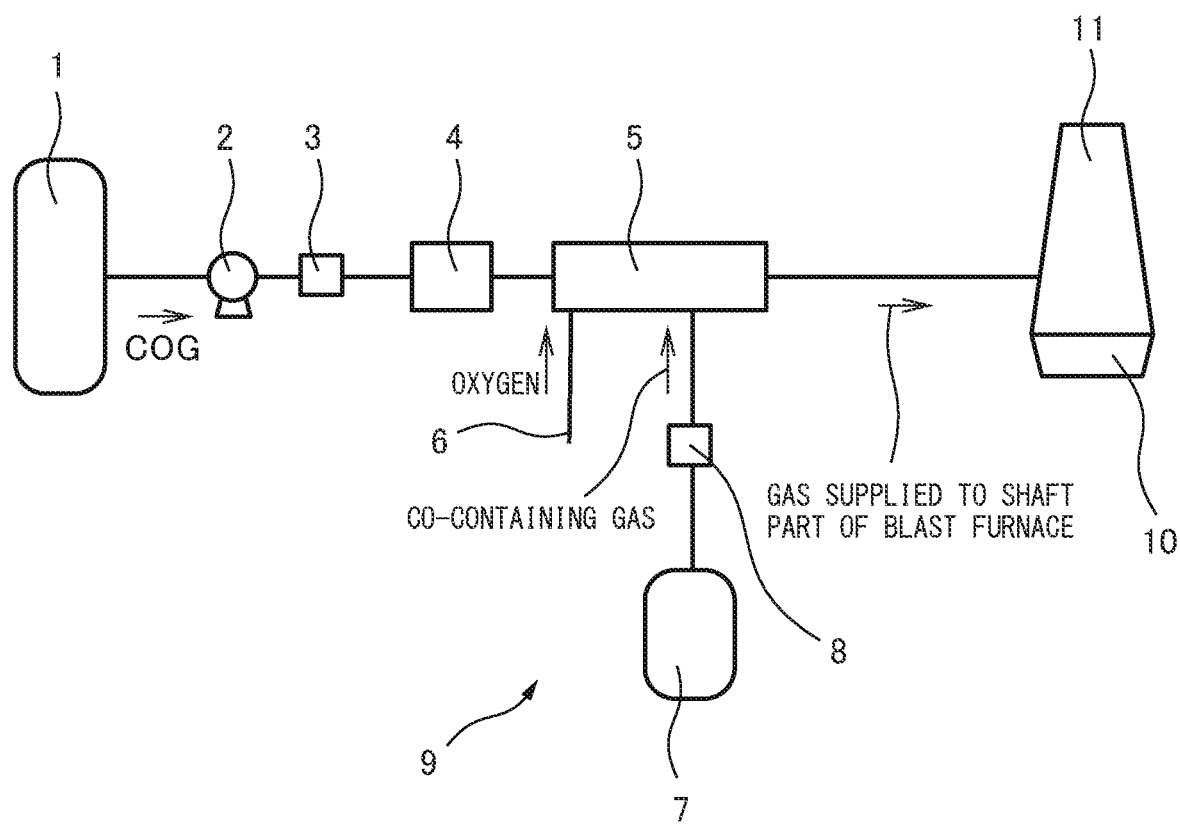
FIG. 4 is a schematic view explaining a first embodiment of manufacture of reducing gas used in the present invention.

The apparatus of the embodiment shown in FIG. 4 is used to produce hydrogen gas for supply to the shaft part of a blast furnace. However, instead of directly blowing the reducing gas to an actual blast furnace, a gas recovery facility was provided at a location corresponding to where the gas is blown to the shaft part of a blast furnace, the temperature and pressure conditions there were set to typical operating conditions at the shaft part of the blast furnace, and the gas flowing into the gas recovery facility was sampled and analyzed for composition. Specifically speaking, a gas holder filled with refined COG as the raw material COG was used as the COG supply source, then the COG from the gas holder was raised in pressure from ordinary pressure to 1 MPa, then was preheated and supplied to the partial oxidation reforming reactor to manufacture reformed gas containing $H_2$. The partial oxidation reforming of the COG is performed by supplying oxygen gas without addition of steam. At the downstream side of the region used for the reforming reaction inside the partial oxidation reforming reactor (region allocated for securing apparent average residence time considered required for reforming), CO-containing gas is supplied to the inside of the reactor and mixed with the reformed gas to obtain reducing gas to be supplied to the shaft part of a blast furnace. Due to the heat exchange between the gases mixed in the process of production of the reducing gas, the high temperature reformed gas generated by the reaction is cooled, while due to the heating (preheating) of the ordinary temperature CO-containing gas, the reducing gas temperature is made a value suitable for reduction at the shaft part of a blast furnace (about 900° C.). If with mixing with ordinary temperature CO-containing gas, the above suitable temperature of the reducing gas could not be obtained, the CO-containing gas was preheated, then mixed with the reformed gas. For preheating the raw material COG and CO-containing gas, the heat exchanger attached to the gas combustion furnace was used.

For the partial oxidation furnace, one with an inside diameter of 0.6 m and a length of 2 m was used. The residence time of the raw material gas inside the partial oxidation furnace was 80 seconds predicated on converting the raw material gas to a flow rate in the standard state.

The main constituents of the refined COG for raw material use were $H_2$: 55%, $CH_4$: 30%, CO: 7%, and $CO_2$: 2% (actually measured values of refined COG obtained by treating crude COG from coke oven using coal not treated to reduce moisture). The CO-containing gas for use for manufacturing the reducing gas is blast furnace gas (BFG) treated by a physical adsorption apparatus to remove $CO_2$. The main constituents of the CO-containing gas were CO: 80% and $N_2$: 18% (actually measured values).

To the partial oxidation reforming reactor, CO-containing gas was supplied under the following three conditions:
a. 0.8 time flow rate of reformed gas
b. 1 time flow rate of reformed gas
c. 2 times flow rate of reformed gas The above refined COG was supplied to the partial oxidation furnace and partially oxidized to obtain the compositions of reformed gases shown in Table 1. Table 1 shows the results obtained under the following three partial oxidation conditions:

$O_2/C$=0.48,raw material COG preheating temperature=1000° C.　　　　　　　　　Partial oxidation 1:

$O_2/C$=0.48,raw material COG preheating temperature=800° C.　　　　　　　　　Partial oxidation 2:

$O_2/C$=0.7,raw material COG preheating temperature=500° C.　　Partial oxidation 3 (comparative example):

In terms of the compositions of the reformed gases, in each case, the concentration of $H_2$ greatly exceeded 35%, so with this, the gases are not suitable as reducing gases for supply to the shaft part of a blast furnace.

TABLE 1

| | | Reformed gas (partial oxidation 1) | Reformed gas (partial oxidation 2) | Reformed gas (partial oxidation 3) |
|---|---|---|---|---|
| Mole fraction | $CH_4$ | 0.03 | 0.06 | 0.06 |
| | $C_2H_4$ | 0.00 | 0.01 | 0.01 |
| | CO | 0.26 | 0.20 | 0.19 |
| | $CO_2$ | 0.01 | 0.01 | 0.02 |
| | $H_2$ | 0.65 | 0.61 | 0.50 |

TABLE 1-continued

|  | Reformed gas (partial oxidation 1) | Reformed gas (partial oxidation 2) | Reformed gas (partial oxidation 3) |
|---|---|---|---|
| $H_2O$ | 0.03 | 0.08 | 0.19 |
| $N_2$ | 0.02 | 0.02 | 0.02 |

Next, the reformed gases of Table 1 were used mixed with CO-containing gas under the following conditions to manufacture reducing gases.

Reducing gas (1):

Reformed gas (partial oxidation 1) diluted by 1.0 time the flow rate of the above CO-containing gas Reducing gas (2):

Reformed gas (partial oxidation 2) diluted by 1.0 time the flow rate of the above CO-containing gas Reducing gas (3):

Reformed gas (partial oxidation 2) diluted by 2.0 times the flow rate of the above CO-containing gas Reducing gas (4):

Reformed gas (partial oxidation 3) diluted by 2.0 times the flow rate of the above CO-containing gas The compositions of the reducing gases supplied to the shaft part of a blast furnace obtained as a result are shown in Table 2. The concentrations of $CO_2$ and $H_2O$ in all examples were of levels not problems as reducing gases to be supplied to the shaft part of a blast furnace. Regarding the concentrations of the hydrocarbons $CH_4$ and $C_2H_4$, in the reducing gas (2), the upper limit values of the restriction on the constituents of the reducing gas supplied to the shaft part of a blast furnace are exceeded and therefore not suitable. As opposed to this, the same reformed gas mixed with more CO-containing gas (3) satisfied the condition of concentration of hydrocarbons. The other reducing gases also satisfied the above-mentioned restrictive condition of the concentration of hydrocarbons. The $\Delta CO_2$ in the reducing gas (4) is equal to the absolute value of the $\Delta CO_2$ cut, so the effect of cutting $CO_2$ added up through the manufacture of the reducing gas and the hydrogen smelting at the blast furnace is not obtained. With the reducing gases (1) to (3), the $\Delta CO_2$ was smaller than the absolute value of the $\Delta CO_2$ cut by hydrogen smelting in the blast furnace so it is possible to cut the total amount of generation of $CO_2$ of the time of manufacturing the reducing gas and hydrogen smelting at the blast furnace. However, with the reducing gases (1) and (3), the $\Delta CO_2$ was close to the absolute value of the $\Delta CO_2$ at the blast furnace. This is because of the supply of the heat required for preheating the raw material COG (case of 1) and the supply of heat required for preheating the CO-containing gas for mixing a large amount of CO-containing gas for diluting the concentration of hydrocarbons in the reducing gas to an allowable value (case of 3 and 4).

TABLE 2

|  |  | Reducing gas (1) | Reducing gas (2) | Reducing gas (3) | Reducing gas (4) |
|---|---|---|---|---|---|
| Mole fraction | $CH_4$ | 0.01 | 0.03 | 0.02 | 0.02 |
|  | $C_2H_4$ | 0.00 | 0.01 | 0.00 | 0.00 |
|  | CO | 0.53 | 0.50 | 0.60 | 0.60 |
|  | $CO_2$ | 0.00 | 0.005 | 0.00 | 0.007 |
|  | $H_2$ | 0.33 | 0.30 | 0.20 | 0.16 |

TABLE 2-continued

|  | Reducing gas (1) | Reducing gas (2) | Reducing gas (3) | Reducing gas (4) |
|---|---|---|---|---|
| $H_2O$ | 0.02 | 0.04 | 0.03 | 0.06 |
| $N_2$ | 0.10 | 0.11 | 0.14 | 0.14 |
| $\Delta CO_2$ (mol/mol$_{H2}$) | 0.12 | 0.08 | 0.14 | 0.16 |

Furthermore, from the measurements, the following results were obtained:

Peak temperature of reformed gas: 1200° C. to 1800° C. in range

Temperature of hydrogen gas supplied to shaft part of blast furnace: 800° C. to 900° C. in range Range of concentration of $H_2$ of hydrogen gas supplied to shaft part of blast furnace: 16% to 33%

At the reducing gases (1) and (3), the manufactured gas satisfied the required temperature and composition conditions of the hydrogen gas supplied to the shaft part of a blast furnace.

From the results of the simulation explained above, if making the flow rate of supply of the reducing gas to the shaft part of a blast furnace a rate exceeding 0.42 time the flow rate of the gas supplied to the blast furnace tuyere, it is possible to supply hydrogen to a deeper part of the blast furnace and possible to enhance the hydrogen smelting effect at the blast furnace.

Example 2

COG extracted from a coke oven using coal reduced in moisture by a DAPS as a raw material was reformed by a carbonization furnace and refined. The reformed COG recovered at a gas holder used as the source of supply of COG was used as the raw material COG for a partial oxidation reforming reaction.

The reformed COG was manufactured as follows by an actual machine. Coal reduced in moisture by a DAPS from 10% to 4% was conveyed by a belt conveyor to a stock vat above the coke oven. For conveying the coal from the stock vat to the inside of the coke oven, a commercially available skip car was used. From a branch pipe provided at the coke raising pipe of the coke oven, approximately 800° C. reduced moisture crude COG was extracted by suction. The extracted reduced moisture crude COG was supplied to the carbonization furnace by a gas pipe maintained in temperature at its surroundings so as to keep the temperature from falling.

The carbonization furnace had gas passage cross-section (horizontal plane) dimensions of 120 mm×900 mm and a gas passage direction height of 1200 mm. The layer of the granular bodies in the carbonization furnace was formed while holding the catalyst filled in the carbonization furnace (diameter 15 mm Ni—MgO-based catalyst) by a holder with a bottom of a drainboard shape. The height was 600 mm. During operation, the carbonization furnace was maintained at 800° C. in temperature by outside heating.

The crude reformed COG from the carbonization furnace was refined using a scrubber to remove the tar and majority of moisture in the gas and obtain reformed COG. The gas temperature of the reformed COG after passing through the scrubber was about 50° C.

The refined reformed COG was transferred by a Roots blower to a gas holder. A branch was provided at the gas pipe to the gas holder, the reformed COG was extracted, then this was supplied to a commercially available gas chromatography apparatus for on-line analysis of the constituents.

Based on the composition of the reformed COG obtained by analysis (see Table 3), partial oxidation reforming similar to Example 1 was performed (under conditions of $O_2/C=0.48$ and a preheating temperature of reformed COG of 800° C.). The rate of decomposition of the hydrocarbons in the partial oxidation was 70%. The reaction was a nonequilibrium reaction. Next, this reformed gas was mixed with 1.0 time the flow rate of CO-containing gas (constituents similar to Example 1). As a result, reducing gas of the composition shown in Table 3 for supply to the shaft part of a blast furnace was obtained.

TABLE 3

| | | Reformed COG (manufacture in carbonization furnace) | Reformed gas (partial oxidation 4) | Reducing gas 4 |
|---|---|---|---|---|
| Mole fraction | $CH_4$ | 0.22 | 0.05 | 0.02 |
| | $C_2H_4$ | 0.03 | 0.01 | 0.00 |
| | CO | 0.09 | 0.17 | 0.48 |
| | $CO_2$ | 0.02 | 0.00 | 0.00 |
| | $H_2$ | 0.61 | 0.68 | 0.35 |
| | $H_2O$ | 0.00 | 0.07 | 0.04 |
| | $N_2$ | 0.03 | 0.02 | 0.10 |
| $\Delta CO_2$ (mol/mol$_{H2}$) | | — | — | 0.09 |

From the results of Table 3, the reducing gases obtained in this example satisfy all of the above-mentioned restrictive conditions on the constituents of a reducing gas to be supplied to the shaft part of a blast furnace. The $\Delta CO_2$ also is a sufficiently smaller one of about half of the absolute value of the $\Delta CO_2$ at the blast furnace so it is possible to cut the $CO_2$ when added with the amount of $CO_2$ cut by the hydrogen smelting at the blast furnace. Furthermore, comparing the present example with the actual values of the refined COG composition obtained by treating crude COG from a coke oven using coal not treated to reduce moisture as the raw material gas in partial oxidation (see Example 1), it is learned that the reformed COG obtained from a coal raw material treated to reduce moisture in the present example is increased in concentration of $H_2$. From this, it is shown that by using reformed COG obtained from a coal raw material treated to reduce moisture so as to work the present invention, it becomes possible to supply a greater amount of $H_2$ to the blast furnace. Further, the present example is more advantageous than any of the reducing gases of Example 1 in that the $\Delta CO_2$ is smaller (except for reducing gas 2 not suitable in composition) and in the point of reduced $\Delta CO_2$ emission.

From the results of the simulation explained above, if making the flow rate of supply of the reducing gas to the shaft part of a blast furnace a rate exceeding 0.42 time the flow rate of the gas supplied to the blast furnace tuyere, it is possible to supply hydrogen to a deeper part of the blast furnace and possible to enhance the hydrogen smelting effect at the blast furnace.

Comparative Example 1

A conventional type of partial oxidation reforming reactor not supplying CO-containing gas to the inside of the partial oxidation reforming reactor was used to manufacture reformed gas. CO-containing gas was separately independently heated to 800° C. by outside heating using a heat exchanger, then was mixed with the above reformed gas to find the $\Delta CO_2$ when supplied to the shaft part of a blast furnace. As the method for this, the amount of $CO_2$ emitted was calculated from the measured value of the amount of heat consumption when independently making the CO-containing gas rise in temperature to 800° C. Next, this was added to the $\Delta CO_2$ of the reducing gas 3 of Example 1 to calculate the overall $\Delta CO_2$. As a result, the $\Delta CO_2$ was 0.19 $molCO_2/mol_{H2}$. This is a value greatly exceeding the results of Example 1 shown as a preferable example (reducing gases (1) and (3) of Table 2) and exceeding the absolute value of the $\Delta CO_2$ emission at the blast furnace (0.16 $molCO_2/mol_{H2}$), so the $CO_2$ cannot be cut. This is due to the heating efficiency of the CO-containing gas in the present comparative example being lower compared with the present invention.

Below, a comparison will be made with a method of manufacture of hydrogen gas for supply to the shaft part of a blast furnace using another method of reforming using COG as a raw material.

Comparative Example 2

Catalytic Steam Reforming of Crude COG

Here, an actual oven was operated for 2 hours and the following procedure was followed to manufacture hydrogen gas for supply to the shaft part of a blast furnace from crude COG. The crude COG extracted from the coke oven was treated by a catalytic reforming reactor (with steam added (S/C (number of molecules of $H_2O$/number of atoms of C in hydrocarbons)=2) at 700° C. or more (Ni—MgO-based catalyst used) to steam reform it, then was refined by a scrubber to manufacture reformed COG. After gas sampling, the reformed COG was raised in pressure (0.3 MPa) and raised in temperature (800° C.) then supplied to the shaft part of a blast furnace. Just the moisture in the crude COG is not sufficient for steam reforming, so 800° C. steam was added from the outside so that S/C=2 at the catalytic reforming reactor.

The chemical composition of the hydrogen gas supplied to the shaft part of a blast furnace obtained as a result and the actual value of the amount of $CO_2$ emitted $\Delta CO_2$ during manufacture of hydrogen are shown in Table 4. $\Delta CO_2$ was calculated from the $CO_2$ in the hydrogen gas supplied to the shaft part of a blast furnace and the theoretical amount of $CO_2$ in the combustion exhaust gas in the case of obtaining the theoretical heat of reaction in the catalytic steam reforming reaction+the energy required for raising the temperature and raising the pressure of the reformed COG by complete combustion of natural gas.

TABLE 4

| | | Hydrogen gas supplied to shaft part of blast furnace manufactured by catalytic steam reforming of crude COG |
|---|---|---|
| Mole fraction | $CH_4$ | 0.22 |
| | $C_2H_4$ | 0.01 |
| | CO | 0.06 |
| | $CO_2$ | 0.11 |
| | $H_2$ | 0.58 |
| | $H_2O$ | — |
| | $N_2$ | 0.02 |
| $\Delta CO_2$ (mol/mol$_{H2}$) | | 0.43 |

In the results of Table 4, the concentration of methane and concentration of $CO_2$ were excessive, so the gas was not suitable as hydrogen gas for supply to the shaft of a blast furnace. Further, it was learned that with just a reforming step, the $\Delta CO_2$ exceeded the allowable value (0.16 $molCO_2$/$mol_{H2}$) so was excessive.

Comparative Example 3

Partial Oxidation Reforming of Crude COG

The manufacture of hydrogen gas for supply to the shaft part of a blast furnace by partial oxidation reforming of crude COG described in Japanese Patent Publication No. 2001-220584 will be studied next.

In Japanese Patent Publication No. 2001-220584, crude COG extracted from a coke oven is reformed by partial oxidation by addition of pure oxygen (using the crude COG itself as the flammable gas), then refined by a scrubber to obtain reformed COG. Consider supplying this reformed COG as the reducing gas (hydrogen gas supplied to shaft part of a blast furnace) to the shaft part of a blast furnace. The chemical composition of the reformed COG obtained by partial oxidation shown in the examples of Japanese Patent Publication No. 2001-220584A and the amount of $CO_2$ emitted $\Delta CO_2$ during production of hydrogen calculated from the amounts of $CO_2$ emitted and the amounts of hydrogen emitted of the same are shown in Table 5.

TABLE 5

| | | Hydrogen gas supplied to shaft part of blast furnace manufactured by partial oxidation reforming of crude COG |
|---|---|---|
| Mole fraction | $CH_4$ | 0.02 |
| | $C_2H_4$ | 0.00 |
| | CO | 0.23 |
| | $CO_2$ | 0.08 |
| | $H_2$ | 0.65 |
| | $H_2O$ | — |
| | $N_2$ | 0.01 |
| $\Delta CO_2$ (mol/$mol_{\Delta H2}$) | | 0.24 or more |

Here as well, it was learned that with just the reforming stage, the $\Delta CO_2$ exceeded the above allowable value (0.16 $molCO_2$/$mol_{H2}$) and was excessive. Further, the concentration of $CO_2$ also greatly exceeded the upper limit concentration as a reducing gas supplied to the shaft of a blast furnace. This was also not suitable in terms of constituents.

Comparative Example 4

Catalytic Steam Reforming of Refined COG

Catalytic steam reforming of refined COG (crude COG refined to remove the majority of the tar, BTX (benzene and other aromatic compounds), moisture, sulfides, and nitrides to obtain fuel gas. Widely used as fuel in ironmaking plants) will be studied next.

Refined COG from the gas holder was raised in temperature (800° C.) and treated by a catalytic reactor (steam added (S/C=2), reaction temperature 700° C. or more, Ni—MgO-based catalyst used) to manufacture reformed COG. This was cooled, raised in pressure (0.3 MPa), then raised in temperature by indirect heating (800° C.) to obtain a gas for supply to the shaft part of a blast furnace. The composition of the reformed COG was found by a small scale test. Assuming this process, the reason why not directly supplying high temperature reformed COG to the shaft part of a blast furnace is as follows: With this process, due to the residual $H_2S$ contained in a large amount in the refined COG, the catalyst is poisoned and loses activity in a short period of time (several hours to several tens of hours). Each time the catalyst loses activity, the reforming operation has to be suspended and a catalyst regeneration operation has to be performed. Therefore, the operation cannot be said to be a continuous reforming operation. For this reason, it is difficult to directly connect such a batch type reaction apparatus to the shaft part of a blast furnace where continuous supply of hydrogen gas is sought for securing stability of operations (gas holder or other production buffer is necessary).

The amount of $CO_2$ emitted $\Delta CO_2$ during production of hydrogen was calculated from the $CO_2$ in the above constituents and the theoretical amount of $CO_2$ in the combustion exhaust gas in the case of obtaining the theoretical heat of reaction in the steam reforming reaction+energy required for raising temperature and raising pressure of reformed COG by complete combustion of natural gas. The results are shown in Table 6.

TABLE 6

| | | Composition of reducing gas |
|---|---|---|
| Mole fraction | $CH_4$ | 0.01 |
| | $C_2H_4$ | 0.00 |
| | CO | 0.10 |
| | $CO_2$ | 0.21 |
| | $H_2$ | 0.66 |
| | $H_2O$ | — |
| | $N_2$ | 0.02 |
| $\Delta CO_2$ (mol/$mol_{H2}$) | | 0.70 |

In Table 6, the concentration of $CO_2$ exceeds the upper limit concentration of the reducing gas supplied to the shaft part of a blast furnace, so is not suitable. Further, the $\Delta CO_2$ exceeds the above allowable value (0.16 $molCO_2$/$mol_{H2}$), so the gas manufactured in this example is not suitable as the reducing gas to be supplied to the shaft part of a blast furnace.

From the above results, in the typical prior art, it is difficult to efficiently manufacture hydrogen gas for supply to the shaft part of a blast furnace under the condition of reduced $CO_2$ emission. The superiority of the present invention is clear.

In the following example, crude COG obtained from a coke oven without using a moisture reducing means and reduced moisture crude COG obtained from a coke oven operating using a DAPS as a moisture reducing means and reducing the coal moisture were used as the raw material gases. The chemical compositions of the crude COG and reduced moisture crude COG are shown in Table 7.

TABLE 7

| | | Crude COG | Reduced moisture crude COG |
|---|---|---|---|
| Mole fraction | $CH_4$ | 0.22 | 0.25 |
| | $C_2H_4$ | 0.04 | 0.04 |
| | CO | 0.05 | 0.06 |
| | $CO_2$ | 0.02 | 0.02 |
| | $H_2$ | 0.39 | 0.44 |
| | $H_2O$ | 0.25 | 0.17 |
| | $N_2$ | 0.03 | 0.03 |

Comparative Example 5

COG extracted from a coke oven using coal treated to reduce moisture by DAPS was treated in a carbonization furnace (temperature 700° C. or more, Ni—MgO-based catalyst used) to manufacture primary reformed gas. This was passed through a scrubber to refine it, then was raised in pressure (0.3 MPa) and raised in temperature, without partial oxidation, by indirect heating (800° C.) and was supplied to the shaft part of a blast furnace.

In the treatment to reduce moisture by DAPS, the coal moisture was reduced from 7% to 4%. The coal reduced in moisture was conveyed by a belt conveyor to a stock vat above the coke oven, then was conveyed by a commercially available skip car from the stock vat to the inside of the coke oven. From a branch pipe provided at the coke raising pipe of the coke oven, approximately 800° C. reduced moisture crude COG was extracted by suction. The extracted reduced moisture crude COG was supplied to the carbonization furnace by a gas pipe maintained in temperature at its surroundings so as to keep the temperature from falling.

The carbonization furnace had gas passage cross-section (horizontal plane) dimensions of 120 mm×900 mm and a gas passage direction height of 1200 mm. The layer of the granular bodies (catalyst layer) in the carbonization furnace was formed while holding the catalyst (diameter 15 mm) filled in the carbonization furnace by a holder with a bottom of a drainboard shape. The height was 600 mm. During operation, the carbonization furnace was maintained at 800° C. in temperature by external heating and was operated for 2 hours to generate 4 kg of coke. Unless otherwise indicated, the coke (solid carbon) deposited at the catalyst layer of the carbonization furnace was not separated and recovered from the catalyst layer during operation. If periodically separating and recovering the coke (solid carbon) deposited on the catalyst layer, the operating time was made 24 hours.

As the refining apparatus, a scrubber was used. The tar and majority of moisture in the reduced moisture crude COG were removed to manufacture the primary reformed gas. The temperature of the gas after passing through the scrubber was about 50° C. A branch for sampling use was provided at the gas passage pipe at the exit side of the scrubber, the primary reformed gas was extracted, then this was supplied to a commercially available gas chromatography apparatus for on-line analysis of the constituents. The results of analysis are shown in Table 8 ("Heat decomposition of reduced moisture crude COG").

TABLE 8

|  |  | Heat decomposition of reduced moisture crude COG |
|---|---|---|
| Mole fraction | $CH_4$ | 0.18 |
|  | $C_2H_4$ | 0.03 |
|  | CO | 0.10 |
|  | $CO_2$ | 0.02 |
|  | $H_2$ | 0.66 |
|  | $H_2O$ | 0.00 |
|  | $N_2$ | 0.02 |
|  | $\Delta CO_2$ (mol/$mol_{H2}$) | 0.13 |

The amount of $CO_2$ emitted during manufacture of hydrogen was calculated from the amount of $CO_2$ in the primary reformed gas and the theoretical amount of $CO_2$ in the combustion exhaust gas in the case of obtaining the theoretical heat of reaction in the above heat decomposition reaction+energy required for raising the temperature and raising the pressure of the primary reformed gas by complete combustion of natural gas. The results of calculation are shown in Table 2 as the $\Delta CO_2$ values. The obtained value (0.13%) is within the range of the allowable value of the amount of $CO_2$ generated when producing hydrogen allowed when producing the above-mentioned 1 mol of hydrogen gas (0.16 $molCO_2/mol_{H2}$) (in NPTL 2, amount of $CO_2$ emitted during manufacture of hydrogen allowed when producing hydrogen gas 1 mol), while the concentrations of methane and hydrogen are excessive. With this, application to reducing gas for supply to the shaft part of a blast furnace is not possible.

Comparative Example 6

The secondary reformed gas chemical composition and the amount of $CO_2$ emitted during manufacture of hydrogen combining primary and secondary reforming in the case of using primary reformed gas obtained by heat decomposition of the reduced moisture crude COG of Comparative Example 5 with an amount of $CO_2$ emitted during manufacture of hydrogen within the above range of allowable values to manufacture the secondary reformed gas by catalytic steam reforming were calculated by thermodynamic calculations assuming equilibrium conditions at the reaction temperature of the secondary reforming. Regarding the secondary reforming, the values of the amounts of generation of the constituents at the time of 100% methane decomposition obtained by equilibrium calculations and the values obtained when making the amounts of generation of the constituents respectively 70% of the values at the time of about 100% methane decomposition and assuming 30% of methane in the primary reformed gas remaining as reformed gas were used (in reforming, about 100% methane decomposition (equilibrium) is not always obtained, so an example where methane is incompletely decomposed will also be studied.) Table 9 shows the amounts of generation of the constituents at the time of 100% decomposition of the methane used and the amounts of generation of the constituents at the time of 70% decomposition.

TABLE 9

|  |  | Equilibrium catalytic steam reforming of reduced moisture crude COG primary reformed gas | Nonequilibrium catalytic steam 70% reforming of reduced moisture crude COG primary reformed gas |
|---|---|---|---|
| Mole fraction | $CH_4$ | 0.00 | 0.04 |
|  | $C_2H_4$ | 0.00 | 0.01 |
|  | CO | 0.16 | 0.09 |
|  | $CO_2$ | 0.03 | 0.02 |
|  | $H_2$ | 0.68 | 0.65 |
|  | $H_2O$ | 0.12 | 0.19 |
|  | $N_2$ | 0.01 | 0.02 |
|  | $\Delta CO_2$ (mol/$mol_{H2}$) | 0.19 | 0.19 |

The constituents of the gas obtained by a steam reforming reaction or partial oxidation reaction (no catalyst) under conditions greatly exceeding 1000° C. are known to be close to the equilibrium composition at the reaction end temperature (substantially the reactor exit side temperature) if sufficiently setting the residence time of the gas in the reactor, so by calculating the equilibrium constituents, it is possible to evaluate the reforming performance of a steam reforming reaction or partial oxidation reaction (no catalyst) under conditions greatly exceeding 1000° C.

The secondary reformed gas obtained by catalytic steam reforming was manufactured by raising the primary reformed gas in temperature (to 800° C.) and treating it in the catalytic reactor (steam added (S/C (number of molecules of H₂O/number of atoms of C in hydrocarbons)=2, reaction temperature 700° C. or more, and Ni—MgO-based catalyst used). The thus manufactured secondary reformed gas was cooled once, raised in pressure (0.3 MPa), then raised in temperature by indirect heating (800° C.) to obtain a gas to be supplied to the shaft part of a blast furnace.

The amount of $CO_2$ emitted during manufacture of hydrogen was calculated from the $CO_2$ derived from the energy supplied at the time of primary reforming, the $CO_2$ in the above constituents, and the theoretical amount of $CO_2$ in the combustion exhaust gas in the case of obtaining the theoretical heat of reaction in the above steam reforming reaction+energy required for raising temperature and raising pressure of secondary reformed gas by complete combustion of natural gas. The results are shown in Table 9.

In both the equilibrium composition at the time of 100% methane decomposition and the nonequilibrium 70% reformed composition, the amount of $CO_2$ emitted during manufacture of hydrogen exceeded the above allowable value (0.16 $molCO_2/mol_{H2}$) so was excessive. Accordingly, the secondary reformed gas of this example is not suitable as the reducing gas for supply to the shaft part of a blast furnace. Furthermore, the moisture and hydrogen in the secondary reformed gas were excessive (allowable value: 10%). With that, supply to the shaft part of a blast furnace is not possible.

Comparative Example 7

The catalytic steam reforming of crude COG (COG obtained from coke oven without using moisture reducing means, for composition, see Table 7) will be explained next.

Crude COG extracted from a coke oven (operated for 24 hours) was treated by a catalytic reactor (800° C. steam added (S/C=2), reaction temperature 700° C. or more, Ni—MgO-based catalyst used) to manufacture secondary reformed gas. This was passed through a scrubber to refine it, then was raised in pressure (0.3 MPa) and raised in temperature by indirect heating (800° C.) to obtain gas for supply to the shaft part of a blast furnace. As explained in Comparative Example 6, the amounts of generation of the constituents of the secondary reformed gas at the time of 100% methane decomposition and the amounts of generation of the constituents at the time of 70% decomposition were found by calculation. Further, the amount of $CO_2$ emitted during manufacture of hydrogen was calculated from the $CO_2$ in the above constituents and the theoretical amount of $CO_2$ in the combustion exhaust gas in the case of obtaining the theoretical heat of reaction in the above catalytic steam reaction+energy required for raising the temperature and raising the pressure of the reformed gas by complete combustion of natural gas. The obtained results are shown in Table 10.

TABLE 10

|  |  | Catalytic steam reforming of crude COG | Equilibrium partial oxidation of crude COG primary reformed gas | Nonequilibrium partial oxidation 70% reforming of crude COG primary reformed gas |
|---|---|---|---|---|
| Mole fraction | $CH_4$ | 0.22 | 0.01 | 0.05 |
|  | $C_2H_4$ | 0.01 | 0.00 | 0.00 |
|  | CO | 0.06 | 0.26 | 0.19 |
|  | $CO_2$ | 0.11 | 0.02 | 0.02 |
|  | $H_2$ | 0.58 | 0.63 | 0.61 |

TABLE 10-continued

|  |  | Catalytic steam reforming of crude COG | Equilibrium partial oxidation of crude COG primary reformed gas | Nonequilibrium partial oxidation 70% reforming of crude COG primary reformed gas |
|---|---|---|---|---|
|  | $H_2O$ | — | 0.07 | 0.11 |
|  | $N_2$ | 0.02 | 0.01 | 0.02 |
| $\Delta CO_2$ (mol/$mol_{H2}$) |  | 0.43 | 0.32 | 0.38 |

In both the equilibrium composition at the time of 100% methane decomposition and the nonequilibrium 70% reformed composition, the amount of $CO_2$ emitted during manufacture of hydrogen exceeded the above allowable value (0.16 $molCO_2/mol_{H2}$) so was excessive. Accordingly, the secondary reformed gas of this example is not suitable as the reducing gas for supply to the shaft part of a blast furnace.

Comparative Example 8

The example of manufacture of primary reformed gas by heat decomposition of the reduced moisture crude COG in a carbonization furnace and manufacture of secondary reformed gas by catalytic steam reforming will be explained.

For manufacture of the primary reformed gas, primary reformed gas obtained by heat decomposition of the reduced moisture crude COG of Comparative Example 5 was used. Next, the primary reformed gas was raised in temperature (800° C.) and was treated by the catalytic reactor (steam added (S/C=2, reaction temperature 700° C. or more, Ni—MgO-based catalyst used) to manufacture the secondary reformed gas. This was cooled once down to ordinary temperature, then raised in pressure (0.3 MPa) and raised in temperature (800° C.) to obtain gas for supply to the shaft part of a blast furnace. As explained in Comparative Example 6, the amounts of generation of the constituents at the time of 100% methane decomposition of the secondary reformed gas and the amounts of generation of the constituents at the time of 70% decomposition were found by calculations.

The amount of $CO_2$ emitted during manufacture of hydrogen was calculated from the $CO_2$ derived from the energy supplied at the time of primary reforming, the $CO_2$ in the above constituents, and the theoretical amount of $CO_2$ in the combustion exhaust gas in the case of obtaining the theoretical heat of reaction in the above catalytic steam reforming reaction+energy required for raising temperature and raising pressure of secondary reformed gas by complete combustion of natural gas. The results are shown in Table 11.

TABLE 11

|  |  | Equilibrium steam reforming of reduced moisture crude COG primary reformed gas | Nonequilibrium steam 70% reforming of reduced moisture crude COG primary reformed gas |
|---|---|---|---|
| Mole fraction | $CH_4$ | 0.00 | 0.04 |
|  | $C_2H_4$ | 0.00 | 0.01 |
|  | CO | 0.16 | 0.10 |
|  | $CO_2$ | 0.03 | 0.02 |
|  | $H_2$ | 0.66 | 0.60 |
|  | $H_2O$ | 0.13 | 0.21 |

TABLE 11-continued

| | Equilibrium steam reforming of reduced moisture crude COG primary reformed gas | Nonequilibrium steam 70% reforming of reduced moisture crude COG primary reformed gas |
|---|---|---|
| $N_2$ | 0.01 | 0.02 |
| $\Delta CO_2$ (mol/mol$_{H2}$) | 0.21 | 0.21 |

In both the equilibrium composition at the time of 100% methane decomposition and the nonequilibrium 70% reforming composition, the amount of $CO_2$ emitted during manufacture of hydrogen exceeded the allowable value (0.16 molCO$_2$/mol$_{H2}$) and was excessive. Accordingly, in this example, the secondary reformed gas is not suitable as reducing gas for supply to the shaft part of a blast furnace. Furthermore, the moisture and hydrogen in the secondary reformed gas are excessive. With this as is, supply to the shaft part of a blast furnace is not possible.

The invention claimed is:

1. A method for supplying a hydrogen-containing reducing gas to a shaft part of a blast furnace, the method comprising manufacturing the hydrogen-containing reducing gas by raising a temperature inside a reactor in which an oxygen-containing gas is supplied to a preheated coke oven gas to 1200 to 1800° C. to reform the coke oven gas and thereby produce reformed gas enriched in hydrogen gas, then mixing a CO-containing gas with that reformed gas in the reactor to adjust a concentration of hydrogen to 15 to 35 vol % (wet) and supplying the hydrogen-containing reducing gas to the shaft part of the blast furnace under a condition of a ratio of a flow rate of blowing the hydrogen-containing reducing gas to the shaft part/a flow rate of blowing an air and/or oxygen to a tuyere>0.42.

2. The method for supplying hydrogen-containing reducing gas to a shaft part of a blast furnace according to claim 1 wherein the oxygen-containing gas is oxygen gas and the method of reforming the gas by raising the temperature in the reactor to 1200 to 1800° C. is partial oxidation of the preheated coke oven gas.

3. The method for supplying hydrogen-containing reducing gas to a shaft part of a blast furnace according to claim 1 wherein the oxygen-containing gas is steam produced by combustion of hydrocarbons and the method of reforming the gas by raising the temperature in the reactor to 1200 to 1800° C. is mixing combustion gas of the hydrocarbons with the preheated coke oven gas.

4. The method for supplying hydrogen-containing reducing gas to a shaft part of a blast furnace according to claim 1, further comprising:
a) a step of raising a pressure of the coke oven gas,
b) a step of adjusting a flow rate of the coke oven gas,
c) a step of preheating the coke oven gas, and
d) a step of raising the temperature of the preheated coke oven gas inside the reactor in which oxygen gas is supplied to 1200 to 1800° C. and reforming the coke oven gas by partial oxidation to produce reformed gas enriched in hydrogen gas, then mixing into that reformed gas the CO-containing gas in the reactor to adjust the concentration of hydrogen of the reformed gas to 15 to 35 vol % (wet) and the temperature to 800 to 1000° C. to produce reforming-use hydrogen gas for supplying to the shaft part of the blast furnace.

5. The method for supplying hydrogen-containing reducing gas to a shaft part of a blast furnace according to claim 4, wherein a concentration of CO in the CO-containing gas is 50 vol % to less than 99 vol % (dry), a concentration of $CO_2$ is 0 vol % (dry) to less than 1 vol % (dry), a concentration of $H_2$ is 0 vol % (dry) to less than 35 vol % (dry), and a concentration of $N_2$ is 1 vol % (dry) to less than 20 vol % (dry).

6. The method for supplying hydrogen-containing reducing gas to a shaft part of a blast furnace according to claim 4, wherein the CO-containing gas is blast furnace gas, converter gas, or synthesis gas treated to remove $CO_2$.

7. The method for supplying hydrogen-containing reducing gas to a shaft part of a blast furnace according to claim 4, wherein the hydrogen-enriched reformed gas contains a hydrocarbon gas in an amount of 1% to 5%.

8. The method for supplying hydrogen-containing reducing gas to a shaft part of a blast furnace according to claim 4, wherein a flow rate of supply (mol/s) of the oxygen gas is 0.4 to less than 0.5 time a flow rate of supply (mol/s) of carbon atoms contained in the hydrocarbons in the coke oven gas.

9. The method for supplying hydrogen-containing reducing gas to a shaft part of a blast furnace according to claim 4, wherein as the coke oven gas, reformed coke oven gas obtained by treating crude coke oven gas, obtained from a coke oven that reduces a moisture in crude coke oven gas emitted, in a carbonization furnace held at 700° C. or more to break down the hydrocarbons in the crude coke oven gas is used.

10. The method for supplying hydrogen-containing reducing gas to a shaft part of a blast furnace according to claim 4, wherein the step of raising the pressure of the coke oven gas and the step of adjusting the flow rate of the coke oven gas are performed in that order or in reverse order before the step of preheating the coke oven gas.

11. The method for supplying hydrogen-containing reducing gas to a shaft part of a blast furnace according to claim 1, further comprising
a) a step of running coke oven gas from the coke oven through a carbonization furnace and breaking down hydrocarbons in the coke oven gas into coke and hydrogen to thereby make a concentration of hydrogen increase,
b) a step of removing a tar and at least part of a moisture in the gas run through the carbonization furnace to manufacture a first reformed gas,
c) a step of raising a pressure of the first reformed gas,
d) a step of preheating the raised pressure first reformed gas,
e) a step of supplying the preheated first reformed gas to a partial oxidation reforming apparatus and supplying combustion gas to that partial oxidation reforming apparatus to further reform the hydrocarbons in the first reformed gas to make the concentration of hydrogen increase to manufacture a second reformed gas, and
f) a step of supplying the second reformed gas from a gas supply port leading to the shaft part of the blast furnace to an inside of the blast furnace.

12. The method for supplying hydrogen-containing reducing gas to a shaft part of a blast furnace according to claim 11, further comprising raising the pressure of the first reformed gas to at least 0.2 MPa in pressure.

13. The method for supplying hydrogen-containing reducing gas to a shaft part of a blast furnace according to claim 11, further comprising preheating the first reformed gas to 800° C. to 1000° C.

14. The method for supplying hydrogen-containing reducing gas to a shaft part of a blast furnace according to claim 11, further comprising supplying combustion gas to the partial oxidation reforming apparatus by
   (i) supplying combustion gas obtained by supplying oxygen gas and flammable gas to a burner,
   (ii) supplying oxygen gas and flammable gas to the partial oxidation reforming apparatus to generate combustion gas inside that partial oxidation reforming apparatus and supplying the same, or
   (iii) supplying oxygen gas to the inside of the partial oxidation reforming apparatus to make part of the first reformed gas burn and supplying the same.

15. The method for supplying hydrogen-containing reducing gas to a shaft part of a blast furnace according to claim 11, further comprising, before preheating the first reformed gas, temporarily holding the raised pressure gas in a gas holder and further raising the pressure of the gas from this gas holder.

* * * * *